United States Patent
Oota

(10) Patent No.: US 8,588,817 B2
(45) Date of Patent: Nov. 19, 2013

(54) WIRELESS COMMUNICATION DEVICE AND METHOD

(75) Inventor: Yoshiyuki Oota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 13/161,599

(22) Filed: Jun. 16, 2011

(65) Prior Publication Data

US 2011/0319108 A1 Dec. 29, 2011

(30) Foreign Application Priority Data

Jun. 23, 2010 (JP) ................. 2010-142148

(51) Int. Cl.
*H04W 4/02* (2009.01)
*H04W 24/00* (2009.01)

(52) U.S. Cl.
USPC ............ 455/456.3; 455/414.2; 455/420; 455/452.1

(58) Field of Classification Search
USPC ............ 455/414.1, 422.1, 446, 452.1, 456.1, 455/69, 522, 509, 67.11, 517, 66.1, 414.2, 455/419, 420, 456.3, 448, 426.1, 7; 370/338, 447, 339, 332
See application file for complete search history.

(56) References Cited

U.S. PATENT DOCUMENTS

| 6,990,117 B1 * | 1/2006 | Tanaka et al. ............ 370/447 |
| 2011/0034196 A1 * | 2/2011 | Jonishi et al. ............ 455/509 |
| 2013/0003633 A1 * | 1/2013 | Kim et al. ................ 370/311 |

FOREIGN PATENT DOCUMENTS

| JP | 10-32869 A | 2/1998 |
| JP | 2006-197264 A | 7/2006 |
| JP | 2010-093385 A | 4/2010 |

* cited by examiner

*Primary Examiner* — John J Lee
(74) *Attorney, Agent, or Firm* — Fujitsu Patent Center

(57) ABSTRACT

A wireless communication device includes an antenna unit that transmits and receives wireless signals, and one or more processors configured to conduct communication with a base station and control displacement of a service area of the base station and a service area of the wireless communication device in response to throughput characteristics of a cell formed by the base station.

10 Claims, 25 Drawing Sheets

WIRELESS COMMUNICATION DEVICE AND METHOD

CROSS-REFERENCE TO RELATED APPLICATIONS

This application is based upon and claims the benefit of priority from the prior Japanese Patent Application No. 2010-142148 filed on Jun. 23, 2010, the entire contents of which are incorporated herein by reference.

FIELD

The present invention relates to a wireless communication device and method.

BACKGROUND

Repeaters that relay and amplify wireless signals transmitted between base stations and mobile stations may be placed in wireless communication systems depending on the communication environment. The placement of repeaters allows for improvements in the communication state in areas where radio waves from base stations are difficult to receive, and also allows an increase in the cover area of a base station instead of setting up a new base station.

A commonly used type of repeater is the Amplify and Forward (AF) type. The AF type simply amplifies and relays received radio waves using an amplifier installed in the device without demodulating or regenerating the received signals.

It is difficult for repeaters to output radio waves with the quality, which is defined by signal to interference and noise power ratio (SINR), higher than that of received radio waves because the repeaters also amplify interference waves at the same time. However, since the structure is simple and manufacturing cost may be reduced, the AF repeaters have been widely used.

Related art discloses a repeater for changing the antenna pattern of radio wave to be transmitted in response to the position of a radio terminal (for example, see Japanese Laid-open Patent Publication No. 2010-93385). Further, a technique used in a relay station has been proposed that increases/decreases its cover area due to control from the base station according to wireless terminal traffic variation (for example, see Japanese Laid-open Patent Publication No. 2006-197264).

Repeaters are installed in locations so that the base station service areas may be expanded, but the service areas of the repeaters are fixed at the time of installation. As a result, changing the direction and the like of the service area of a repeater requires manual adjustment (e.g., changing the direction of the antenna of the repeater and the like), and the fact that conventional repeaters may not be able to autonomously change the position of the service area is a problem.

SUMMARY

According to an aspect of the invention, a wireless communication device includes an antenna unit that transmits and receives wireless signals, and one or more processors configured to conduct communication with a base station and control displacement of a service area of the base station and a service area of the wireless communication device in response to throughput characteristics of a cell formed by the base station.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
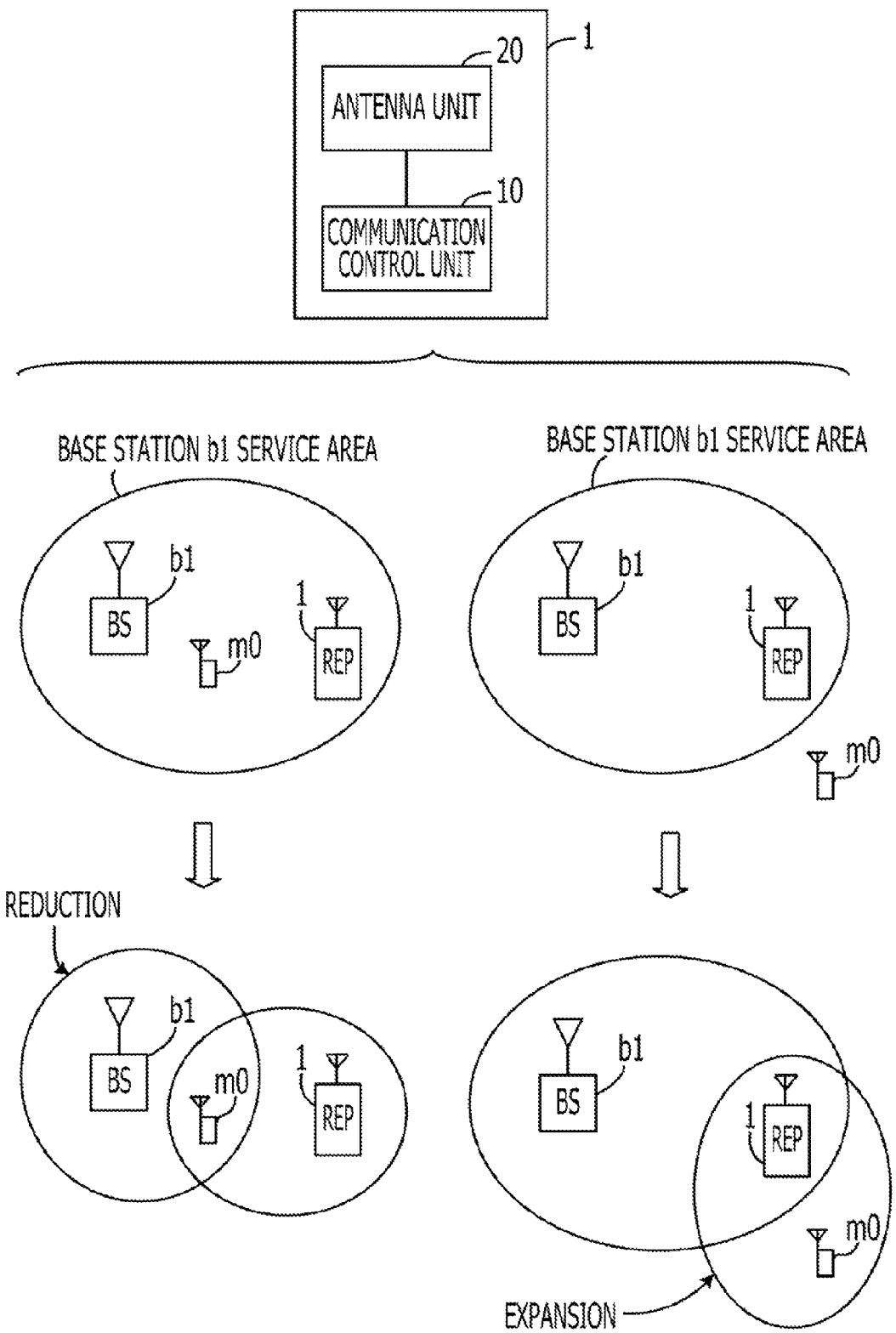
FIG. 1 illustrates an example configuration of a wireless communication device.

The following embodiments of the present invention will be explained with reference to the drawings. FIG. 1 illustrates an example configuration of a wireless communication device. A wireless communication device 1 having a communication control unit 10 and an antenna unit 20 that corresponds to a repeater that conducts, for example, relay communication for base and mobile stations.

The antenna unit 20 transmits and receives wireless signals. The communication control unit 10 communicates with a base station, recognizes the position of a mobile station, and controls the displacement of the service areas of the base station and of the communication control unit 10 based on the result of the recognition (controlling the displacement of the service area refers to controlling the direction and size of the service area according to the communication environment).

For example, when a mobile station m0 is located near a base station b1, the wireless communication device 1 recognizes the position of the mobile station m0, sets the radio wave path to cover the mobile station m0, and reduces the service area of the base station b1.

When the mobile station m0 is located outside the service area periphery of the base station b1, the wireless communication device 1 recognizes the location of the mobile station m0, sets the radio wave path to cover the mobile station m0, and forms its own service area. That is, the service area of the base station b1 is expanded through the wireless communication device 1. Details of service area displacement controls will be explained below.

The following will describe a service area formed by a base station and a service area formed by a repeater. In the following explanation, the base station service area may be also referred to as a cell.

Figure 2:
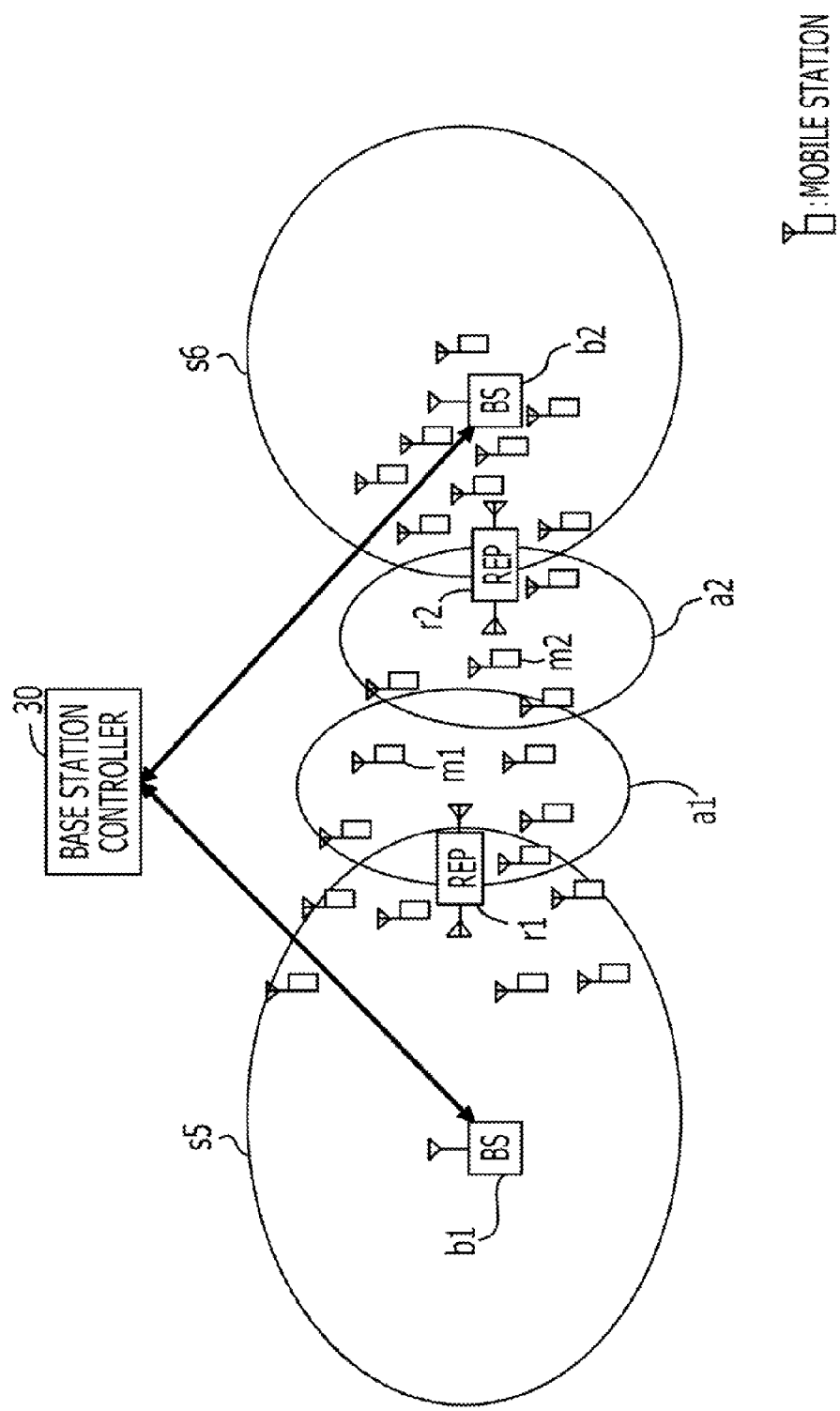
FIG. 2 illustrates service areas configured by a base station and repeaters.

FIG. 2 illustrates service areas formed by a base station and repeaters. Base stations b1 and b2 are coupled to a base station controller 30. The base station b1 forms a cell s5 and the base station b2 forms a cell s6.

A repeater r1 forms a service area a1 to cover mobile stations that may not be covered by the cell s5 of the base station b1. A repeater r2 forms a service area a2 to cover mobile stations that may not be covered by the cell s6 of the base station b2.

When downlink communication occurs with a mobile station (e.g., mobile station m1) inside the service area a1, radio waves emitted by the base station b1 are amplified and transmitted by the repeater r1 and received by the mobile station m1. Similarly, when downlink communication occurs with a mobile station (e.g., mobile station m2) inside the service area a2, radio waves emitted by the base station b2 are amplified and transmitted by the repeater r2 and received by the mobile station m2.

On the other hand, when uplink communication occurs with the mobile station m1 inside the service area a1, radio waves emitted by the mobile station m1 are amplified and transmitted by the repeater r1 and received by the base station b1. Similarly, when uplink communication occurs with the mobile station m2 inside the service area a2, radio waves emitted by the mobile station m2 are amplified and transmitted by the repeater r2 and received by the base station b2.

The base stations b1 and b2 form their own respective service area cells s5 and s6 according to instructions from the base station controller 30, and the repeaters r1 and r2 are placed in blind zones.

Normally, repeaters r1 and r2 are not connected to the base station controller 30, and the service areas a1 and a2 of the respective repeaters r1 and r2 are fixed at installation. As a result, changing the service areas a1 and a2 requires time and labor since such adjustments are usually conducted manually.

Temporarily connecting the repeaters r1 and r2 to the base station controller 30 to allow control of the repeaters r1 and r2 by the base station controller 30 would make the establishment of optimal service areas difficult since the load on the base station controller 30 that already controls multiple base stations would increase even further.

Installing a new base station in place of the repeaters r1 and r2 may also be considered; however the costs for covering a similar service area are high compared to a typical repeater and would not be considered a practical solution.

In view of the above problems, the wireless communication device 1 with a signaling function that exchanges information with nearby base stations is provided as a repeater so that the repeater may adaptively and autonomously displace a service area to improve the service quality and communication quality.

The following is an explanation of an installation location of the wireless communication device 1. In the following, the wireless communication device 1 will be referred to as a repeater 1.

Figure 3:
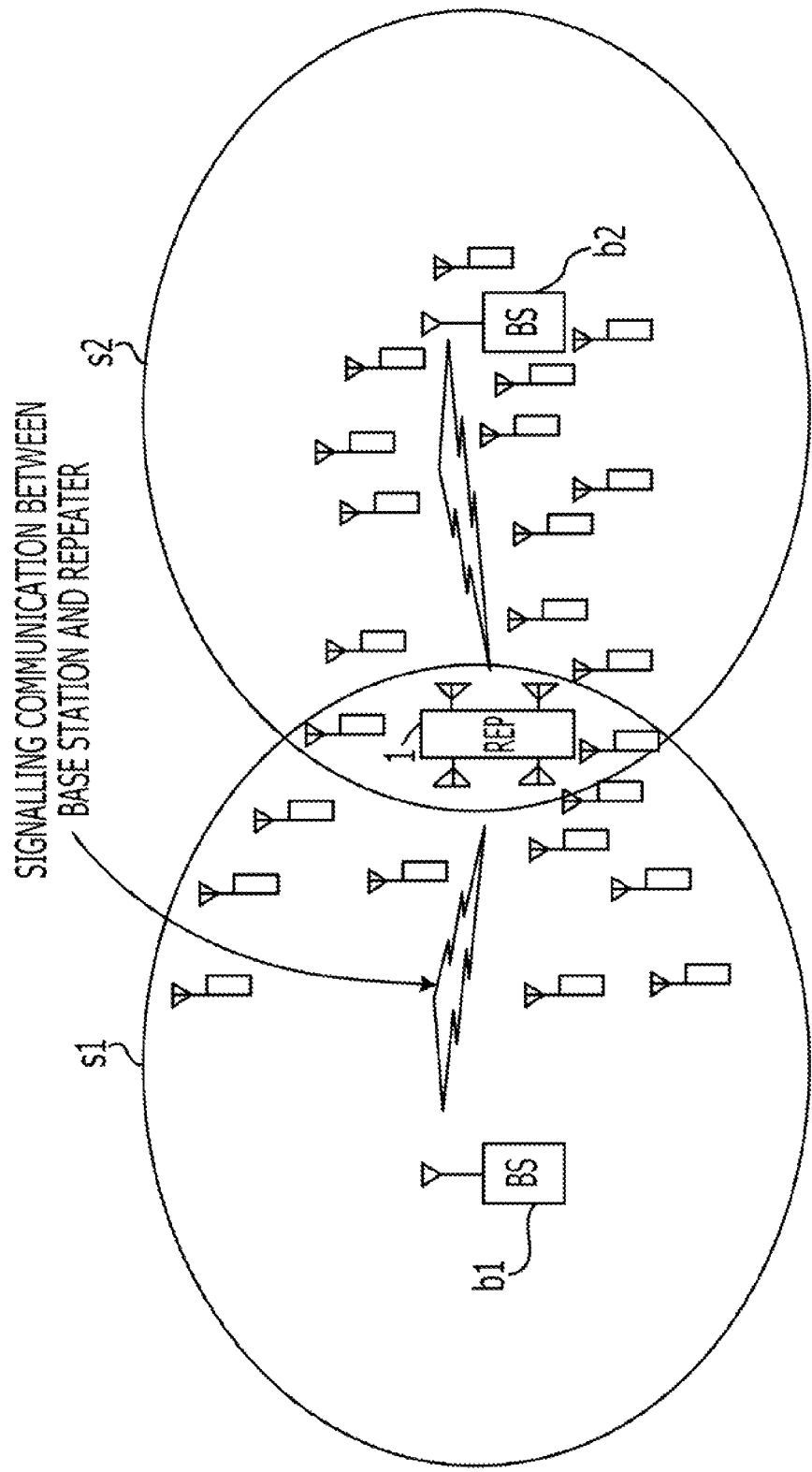
FIG. 3 illustrates an example placement of a repeater.

FIG. 3 illustrates an example placement of the repeater 1. The base station b1 forms a cell s1 and the base station b2 forms a cell s2. The repeater 1 is installed in between the base stations b1 and b2 at the peripheries of the cells s1 and s2. The repeater 1 also has a signaling function for exchanging information with the base stations b1 and b2.

Since the power of the wireless signals near the base stations b1 and b2 is strong, both the SINR and the throughput are high. Since the power of the wireless signals at the cell peripheries far away from the base stations b1 and b2 is weak, both the SINR and the throughput are low.

Throughput relates to the transmission quantity per unit of time. That is, when the throughput is high, the transmission quantity per unit of time is also high. When the throughput is low, the transmission quantity per unit of time is also low.

Therefore, by placing the repeater 1 at the periphery of the cells, the SINR and the throughput near the repeater 1 are high and hence the throughput may be made uniform throughout the service areas covering the base stations b1 and b2 and the repeater 1.

The following is an explanation about the operations of the repeater 1. The communication control unit 10 in the repeater 1 has a signaling function for exchanging information with nearby base stations. The signaling function is used to collect distance information and a requested throughput of the mobile stations from the nearby base stations to calculate a statistical throughput.

The requested throughput of the mobile stations is the throughput requested by the mobile stations to the base stations that the mobile stations are communicating with. For example, if a transmission speed (throughput) for any mobile station to conduct voice communication with a base station is 20 kilobits per second (kbps), and the throughput for any mobile station to conduct video communication with a base station is 2 megabits per second (Mbps), these values may be the mobile station requested throughput requested by each mobile station.

The statistical throughput is the throughput calculated from the mobile station requested throughput and the ratio of the distance between the base station and the mobile station. Here, if a mobile station number is i, and a base station number is j, the number of mobile stations is N, the requested throughput value for the mobile station i in the cell of the base station j is $A_{ji}$, and the distance between the base station j and the mobile station i in the cell is $D_{ji}$, the statistical throughput $X_j$ of the base station j is calculated using the following equation (1):

(Equation 1)

$$X_j = \sum_{i=1}^{N} (A_{ji}/D_{ji}) \quad (1)$$

Figure 4:
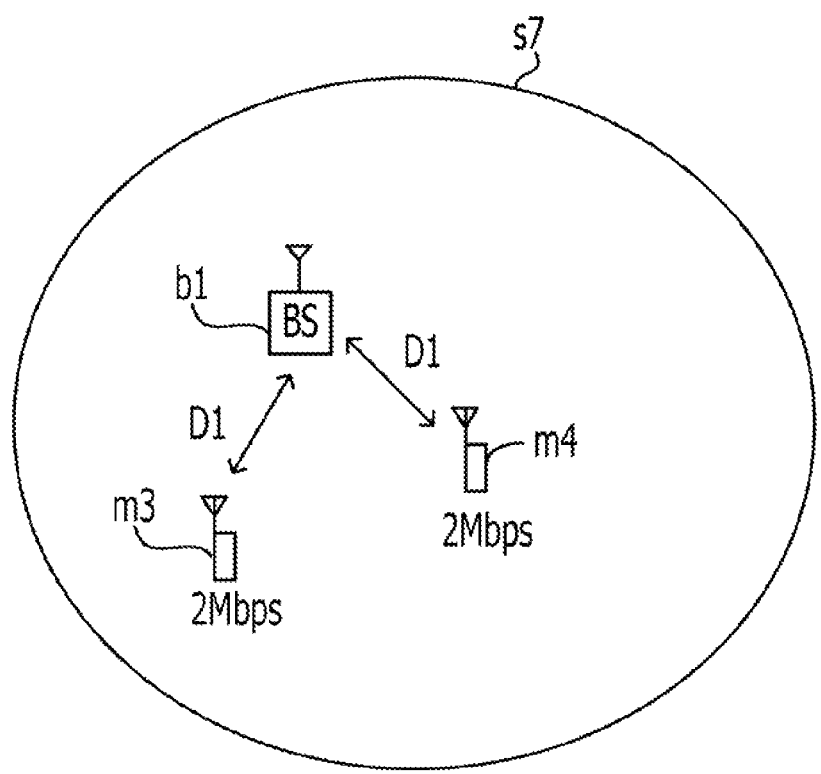
FIG. 4 illustrates an example diagram for calculation of statistical throughput.
Figure 5:
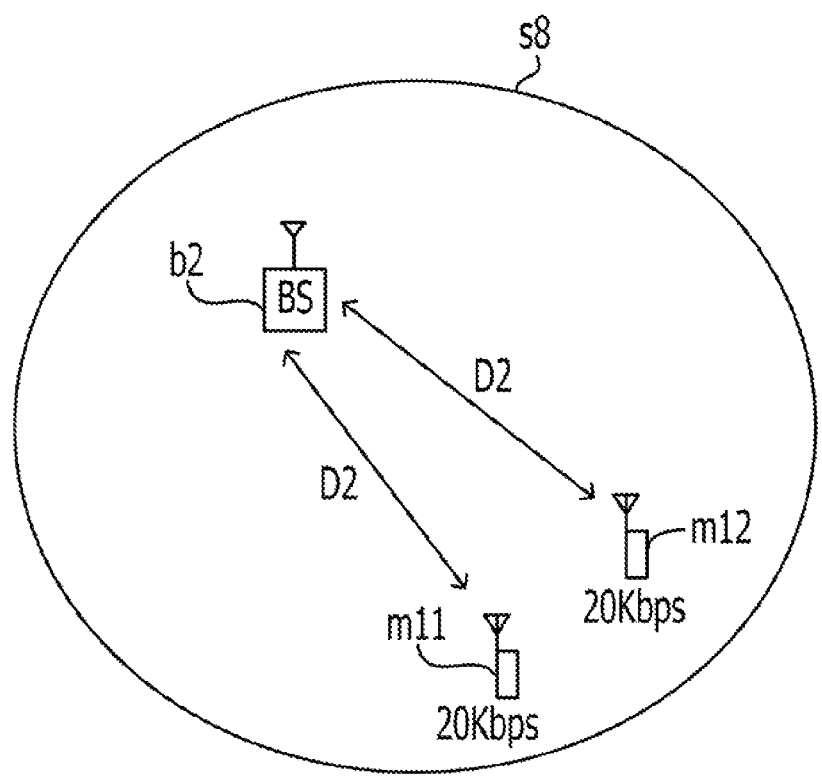
FIG. 5 illustrates an example diagram for calculation of statistical throughput.

FIGS. 4 and 5 illustrate an example calculation of statistical throughput. In FIG. 4, mobile stations m3 and m4 are inside the cell s7 of the base station b1. Both of the mobile stations m3 and m4 are conducting 2 Mbps video communication with the base station b1 and the distances between the mobile stations m3 and m4 and the base station b1 are represented by D1. In this case, the statistical throughput $X_{b1}$ of the base station b1 is represented by $X_{b1}=(2M/D1)+(2M/D1)$.

In FIG. 5, mobile stations m11 and m12 are inside the cell s8 of the base station b2. Both of the mobile stations m11 and m12 are conducting 20 kbps voice communication with the base station b2 and the distances between the mobile stations m11 and m12 and the base station b2 are represented by D2. In this case, the statistical throughput $X_{b2}$ of the base station b2 is represented by $X_{b2}=(0.02M/D2)+(0.02M/D2)$. By calculating the statistical throughput as described above, an index to recognize the throughput characteristics desired in the cell for good efficiency may be obtained.

Conversely, a statistical throughput $X_j$ calculated as described above may be compared to a specified threshold (Th) in the communication control unit 10, and a suitable service area of the repeater 1 may be configured based on the result of the comparison.

Specifically, the communication control unit 10 determines that the requested throughput of the mobile station at a location near a base station j is high when $X_j$ is equal to or greater than Th. In this case, the communication control unit 10 recognizes that many mobile stations are located near the base station and configures a service area to have a high throughput for the mobile stations. In the following explanation, a condition where many mobile stations are located near the base station j and $X_j$ is equal to or greater than Th will be referred to as "center large."

Moreover, the communication control unit 10 determines that the requested throughput of the mobile stations at the periphery of the cell of the base station j is high when $X_j$ is less than Th. In this case, the communication control unit 10 recognizes that many mobile stations are located at the cell periphery away from the base station j and configures a service area to make a high throughput for the mobile stations. In the following explanation, a condition where many mobile stations are located at the cell periphery of the base station j and $X_j$ is less than Th will be referred to as "periphery large." By comparing the statistical throughput with a threshold as described above, the communication control unit 10 may recognize the throughput characteristics desired in the cell for good efficiency.

In this way, after deciding whether to expand or reduce the service area, the communication control unit 10 determines and controls the communication power of the base station, the communication power of the repeater 1, and the path setting (relay radio wave transmission direction) of the repeater 1 so that an expanded or reduced service area may be formed after making the decision.

Figure 6:
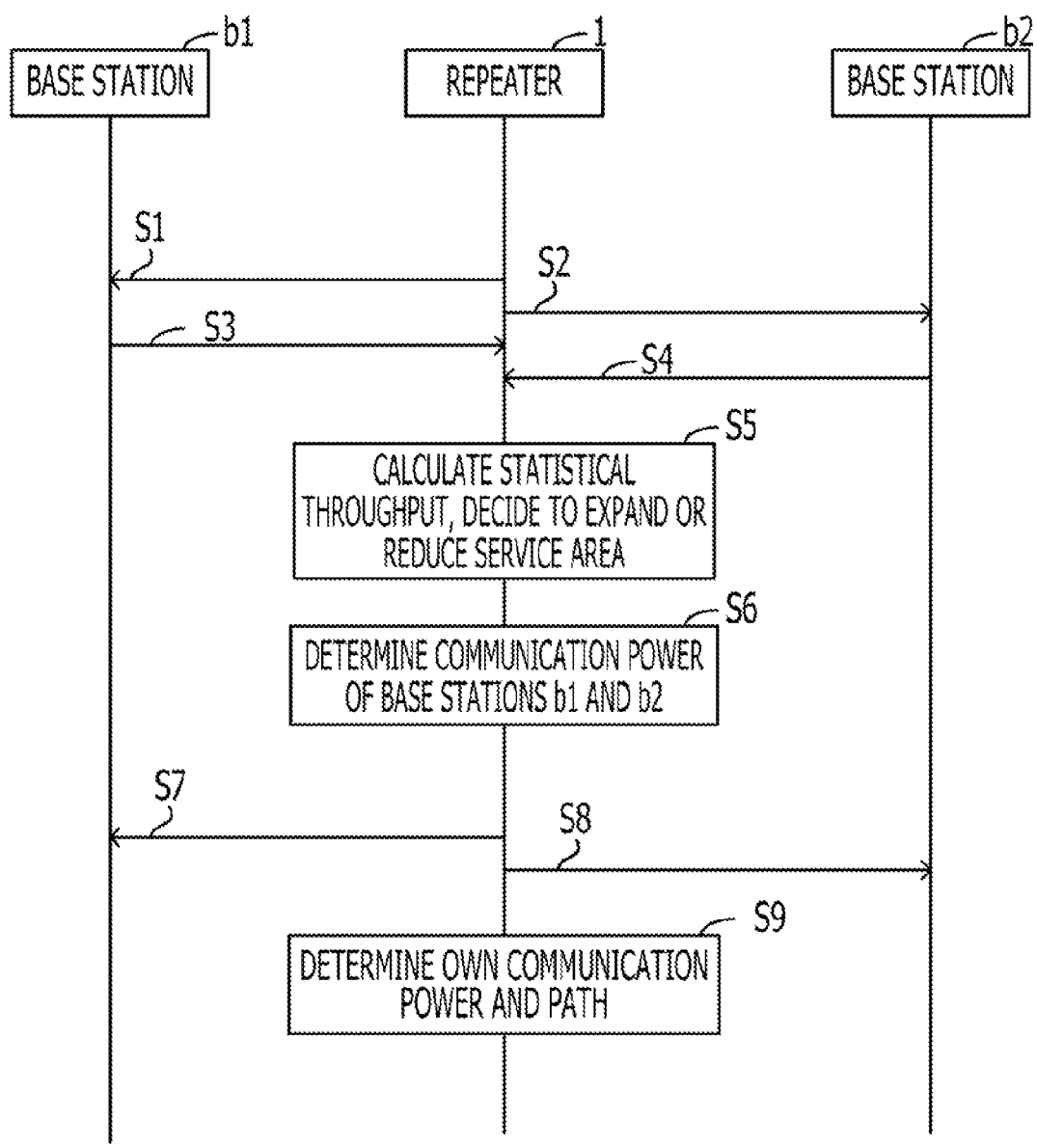
FIG. 6 is a sequence diagram illustrating signaling between a base station and a repeater.

The following explanation will describe the signaling between the base station and the repeater 1. FIG. 6 is a sequence diagram illustrating signaling between a base station and the repeater 1. The explanation is based on the configuration illustrated in FIG. 3.

(S1) The repeater 1 requests the base station b1 to transmit the distances between the base station b1 and the mobile stations located in the cell s1 of the base station b1, and the requested throughputs of the mobile stations located in the cell s1.

(S2) The repeater 1 requests the base station b2 to transmit the distances between the base station b2 and the mobile stations located in the cell s2 of the base station b2, and the requested throughputs of the mobile stations located in the cell s2.

(S3) The base station b1 transmits the distance information and the requested throughput information of the mobile stations to the repeater 1.

(S4) The base station b2 transmits the distance information and the requested throughput information of the mobile stations to the repeater 1.

(S5) The repeater 1 calculates the statistical throughputs of the cells s1 and s2 and decides whether to expand or reduce the service areas.

(S6) The repeater 1 determines the communication power values of the radio waves emitted by the base stations b1 and b2 to expand or reduce the cell s1 of the base station b1 and to expand or reduce the cell s2 of the base station b2.

(S7) The repeater 1 transmits an instruction regarding the communication power value of the base station b1 to the base station b1.

(S8) The repeater 1 transmits an instruction regarding the communication power value of the base station b2 to the base station b2.

(S9) The repeater 1 determines its own radio wave communication power and the path (transmission direction). After making the determination, the repeater 1 conducts relay transmission using the determined communication power and the path.

Figure 7:
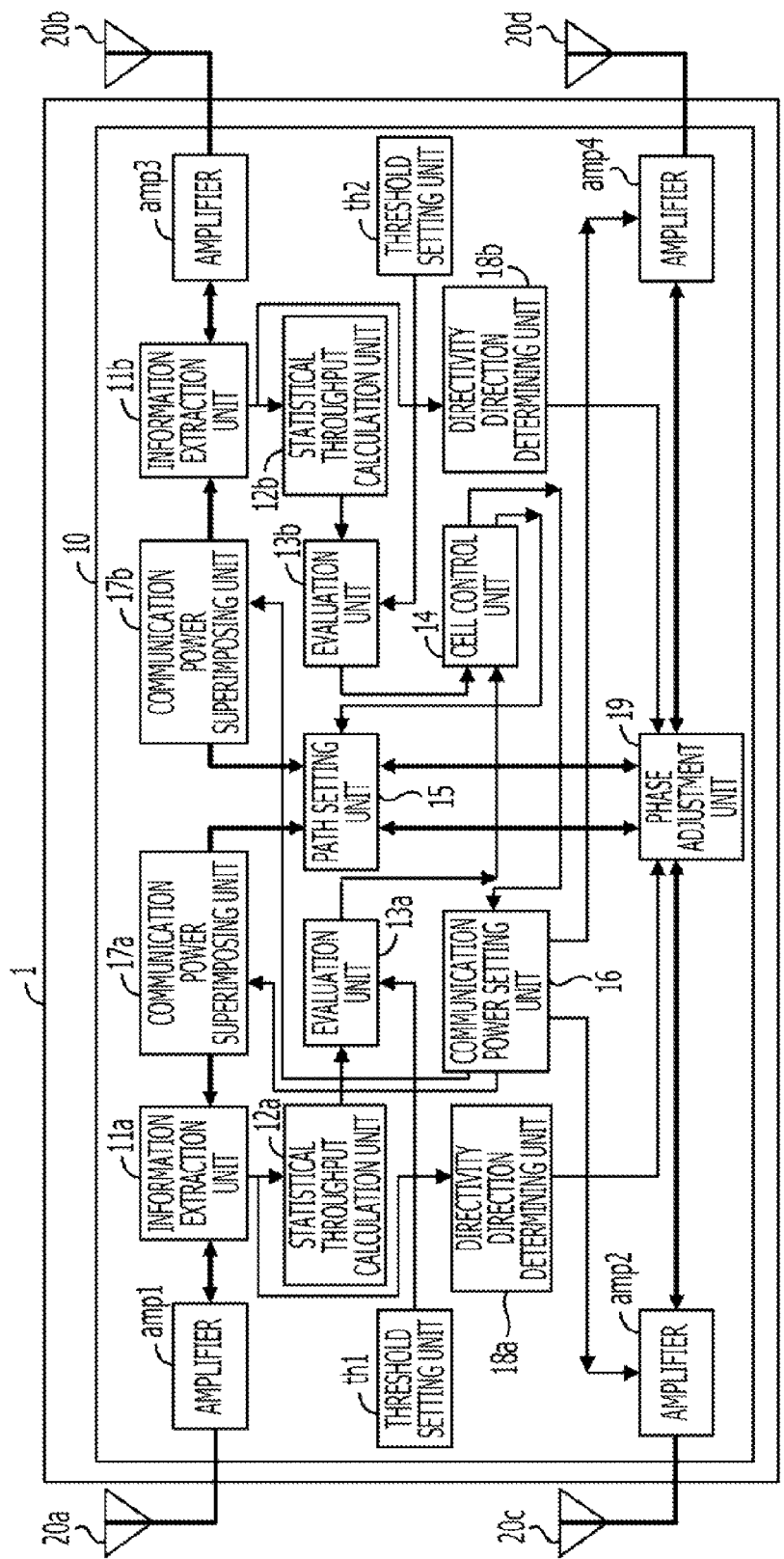
FIG. 7 illustrates an example configuration of a repeater.

The following is a description of a detailed configuration of the repeater 1. FIG. 7 illustrates an example configuration of the repeater 1. The repeater 1 includes a communication control unit 10, antennas 20a and 20b that are antennas for communicating with the base stations, and antennas 20c and 20d (corresponding to the antenna unit 20 in FIG. 1) that are arrays of a plurality of directional antennas for communication with the mobile stations. Although the number of antennas indicated in the drawing is four, any number of antennas may be installed.

The communication control unit 10 includes amplifiers amp1 to amp4, threshold setting units th1 and th2, information extraction units 11a and 11b, statistical throughput calculation units 12a and 12b, evaluation units 13a and 13b, a cell control unit 14, a path setting unit 15, a communication power setting unit 16, communication power superimposition units 17a and 17b, directivity direction determining units 18 and 18b, and a phase adjustment unit 19.

The antenna 20a is a base station-oriented antenna directed towards the base station b1 for transmitting radio signals to and from the base station b1. The antenna 20b is a base station-oriented antenna directed towards the base station b2 for transmitting wireless signals to and from the base station b2.

The antenna 20c is a mobile station-oriented antenna for transmitting wireless signals to and from the mobile stations communicating with the base station b1. The antenna 20d is a mobile station-oriented antenna for transmitting wireless signals to and from the mobile stations communicating with the base station b2.

The amplifiers amp1 to amp4 amplify signals. The information extracting units 11a and 11b separate and extract mobile station requested throughput information and distance information from received signals. The statistical throughput calculation units 12a and 12b calculate the statistical throughput from the requested throughput and distance information of the mobile stations.

The evaluation unit 13a compares the calculated statistical throughput with a threshold value determined ahead of time by the threshold setting unit th1, and then determines whether the base station b1 service area is "center large" or "periphery large". Similarly, the evaluation unit 13b compares the calculated statistical throughput with a threshold value determined ahead of time by the threshold setting unit th2, and then determines whether the base station b2 service area is "center large" or "periphery large".

The cell control unit 14 determines whether to expand or reduce each base station cell based on the evaluation result (communication power setting), and the transmission direction and communication power of the host repeater. The path setting unit 15 switches the path (transmission direction) according to the determination of the cell control unit 14. The communication power setting unit 16 sets the communication power of the base station and the host repeater according to the determination of the cell control unit 14.

The communication power superimposition units 17a and 17b each superimpose the communication power setting information of the base stations onto the uplink signals of the base station-oriented antennas 20a and 20b. The directivity direction determining units 18a and 18b search for the angular direction with the largest statistical throughput based on the information from the information extracting unit 11a (described below in reference to FIGS. 14 and 15).

The phase adjustment unit 19 adjusts the phases of the mobile station-oriented antennas 20c and 20d to match a directivity pattern based on the angular direction derived by the directivity determining units 18 and 18b.

The functions of the amplifiers amp1 to amp4, the information extracting units 11a and 11b, the path setting unit 15, the communication power superimposing units 17a and 17b, and the phase adjustment unit 19 may be implemented as analog circuits. The functions of the threshold setting units th1 and th2, the statistical throughput calculation units 12a and 12b, the evaluation units 13a and 13b, the communication power setting unit 16, and the directivity direction determining units 18a and 18b may be realized by, e.g., a Digital Signal Processor (DSP). The function of the cell control unit 14 may be realized as, e.g., a Central Processing Unit (CPU).

The expanding and reducing displacement of the service areas will be explained below with reference to examples (1) to (7). The propagation environment between the base station and the repeater 1 is substantially unobstructed, and the antennas 20a and 20b in the repeater 1 are directivity antennas and the antenna height is high.

(1) The local base stations of the repeater 1 are the base stations b1 and b2. The statistical throughputs of both the base stations b1 and b2 are "center large".

Figure 8:
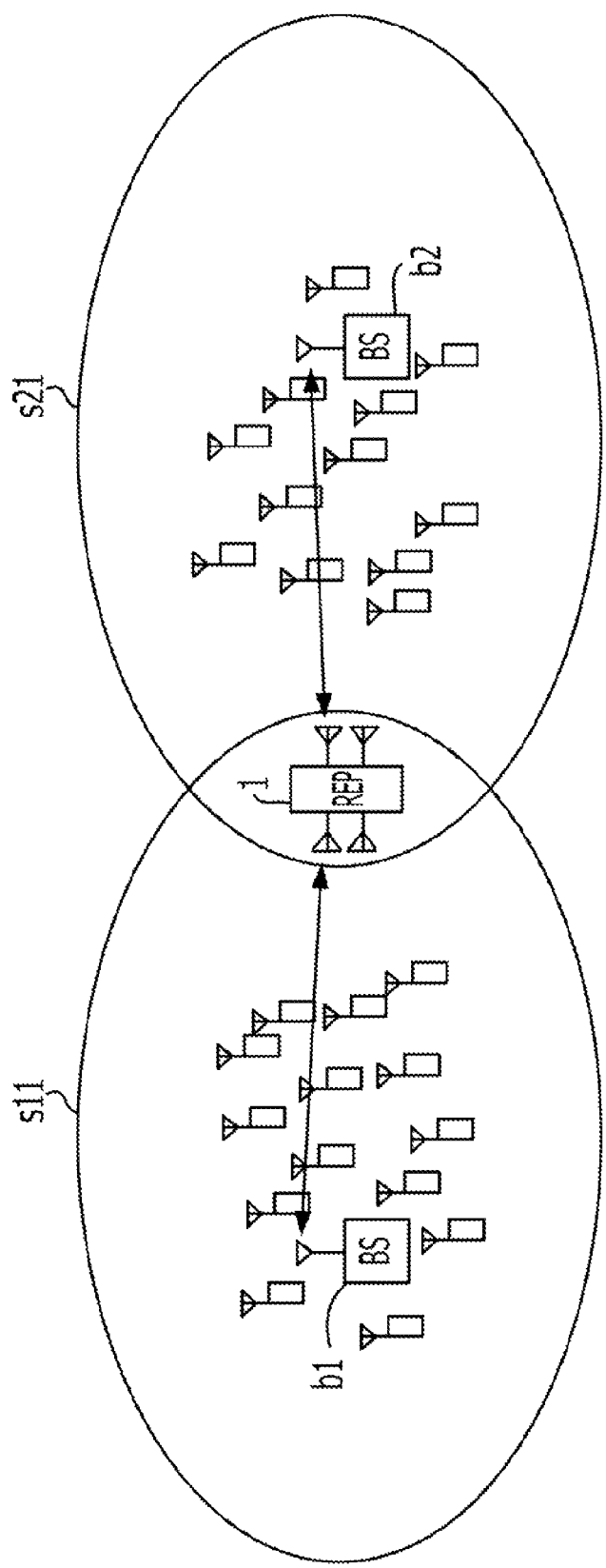
FIG. 8 illustrates a service area before displacement.

FIG. 8 illustrates a service area before displacement. The base station b1 forms a cell s11 and the base station b2 forms a cell s21. The repeater 1 is installed between the base stations b1 and b2 at the peripheries of the cells s11 and s21. The distribution of the mobile stations indicates that many mobile stations are concentrated in an area near the base station b1 and many mobile stations are concentrated in an area near the base station b2.

Figure 9:
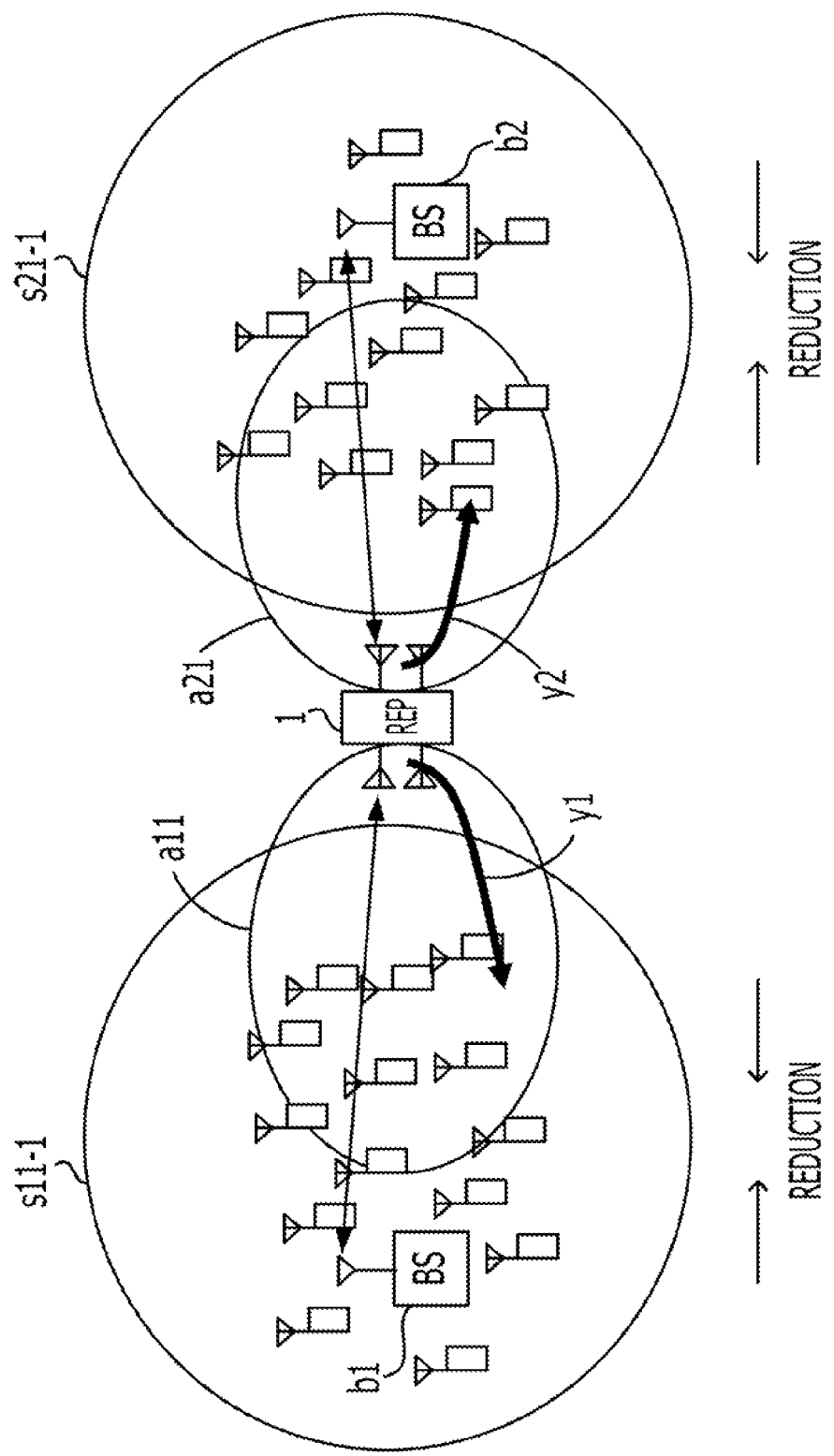
FIG. 9 illustrates the service area after displacement.

FIG. 9 illustrates the service area after displacement. The service area after the displacement of the service area illustrated in FIG. 8 is illustrated. The repeater 1 determines that the base station b1 throughput is "center large" and as a result of the determination, the repeater 1 recognizes that many mobile stations are located near the base station b1. The repeater 1 also determines that the base station b2 throughput is "center large" and as a result of the determination, the repeater 1 recognizes that many mobile stations are located near the base station b2.

In this case, the repeater 1 determines that the path setting related to the relay communication with the base station b1 is a return path from the base station b1 and back to the base station b1 (base station b1 to base station b1). Based on this path, the radio waves emitted by the base station b1 are amplified by the repeater 1 and the amplified radio waves are sent back to the mobile stations located near the base station b1 (arrow y1). Therefore, the service area of the repeater 1 for relaying communication with the base station b1 becomes a service area a11 that includes a region between the base station b1 and the repeater 1.

Moreover, the communication power of the repeater 1 for relaying communication with the base station b1 may be maintained at an initial level instead of being changed to a high level since the repeater 1 relays communication to the mobile stations located near the base station b1.

Furthermore, the communication power of the base station b1 may be reduced below the initial level since the mobile stations are located near the base station b1 and the radio waves sent back by the repeater 1 are also relayed to the mobile stations.

Therefore, the communication power of the base station b1 is set to a value with an offset portion subtracted from the communication power initial value. As a result, the cell s11 region of the base station b1 may be reduced by reducing the communication power and thus become a cell s11-1 illustrated in FIG. 9.

Similarly, the repeater 1 determines that the path setting related to the relay communication with the base station b2 is a return path from the base station b2 and back to the base station b2 (base station b2 to base station b2). Based on this path, the radio waves emitted by the base station b2 are amplified by the repeater 1 and the amplified radio waves are sent back to the mobile stations located near the base station b2 (arrow y2). Therefore, the service area of the repeater 1 for relaying communication with the base station b2 becomes a service area a21 that includes a region between the base station b2 and the repeater 1.

Moreover, the communication power of the repeater 1 for relaying communication with the base station b2 may be maintained at an initial level instead of being changed to a high level since the repeater 1 relays communication to the mobile stations located near the base station b2.

Furthermore, the communication power of the base station b2 may be reduced below the initial level since the mobile stations are located near the base station b2 and the radio waves sent back by the repeater 1 are also relayed to the mobile stations.

Therefore, the communication power of the base station b2 is set to a value with an offset portion subtracted from the communication power initial value. As a result, the cell s21 region of the base station b2 may be reduced by reducing the communication power and thus become a cell s21-1 illustrated in FIG. 9.

Here, the initial communication power of the base station b1 shall be $P_{BS1int}$, the initial communication power of the base station b2 shall be $P_{BS2int}$, the initial communication power of the repeater 1 shall be $P_{REPint}$, and the communication power offset when reducing a cell shall be $P_X$.

When the statistical throughputs of the base stations b1 and b2 are both "center large", the base station b1 communication power $P_{BS1}$, the base station b2 communication power $P_{BS2}$, and the repeater 1 communication power $P_{REP}$ may be described as follows.

$$P_{BS1} = P_{BS1int} - P_X \qquad (2a)$$

$$P_{BS2} = P_{BS2int} - P_X \qquad (2b)$$

$$P_{REP} = P_{REPint} \qquad (2c)$$

If the base station b1 were to be notated as BS1 and the base station b2 were to be notated as BS2, the path setting in the repeater 1 would become BS1 to BS1 and BS2 to BS2. As described above, reduced power consumption of the base stations b1 and b2 may be achieved by reducing the communication power of both the base stations b1 and b2 to reduce the respective cells.

(2) The local base stations of the repeater 1 are the base stations b1 and b2. The statistical throughput of the base station b1 is "periphery large" and the statistical throughput of the base station b2 is "center large".

Figure 10:
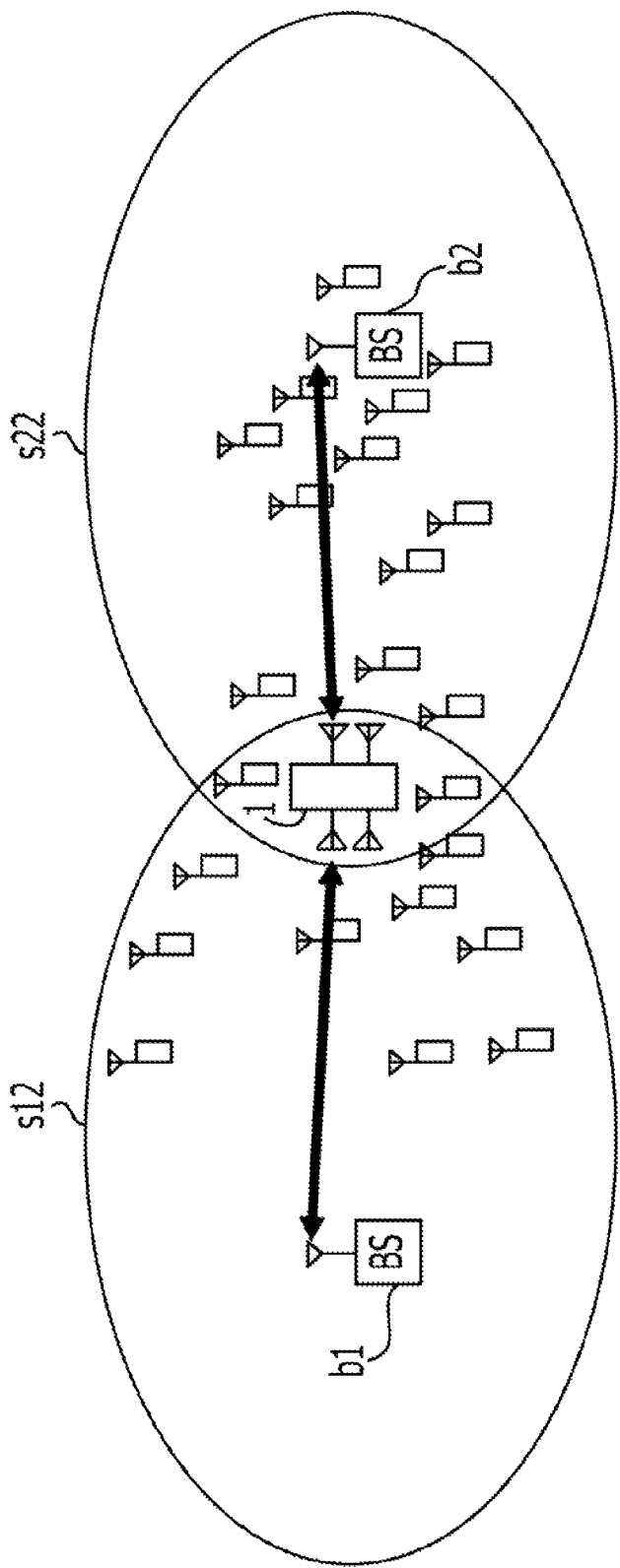
FIG. 10 illustrates a service area before displacement.

FIG. 10 illustrates a service area before displacement. The base station b1 forms a cell s12 and the base station b2 forms a cell s22. The repeater 1 is placed between the base stations b1 and b2 at the peripheries of the cells s12 and s22. The distribution of the mobile stations indicates that many mobile stations are located in the periphery of the cell s12 near the repeater 1 and many mobile stations are located in an area near the base station b2.

Figure 11:
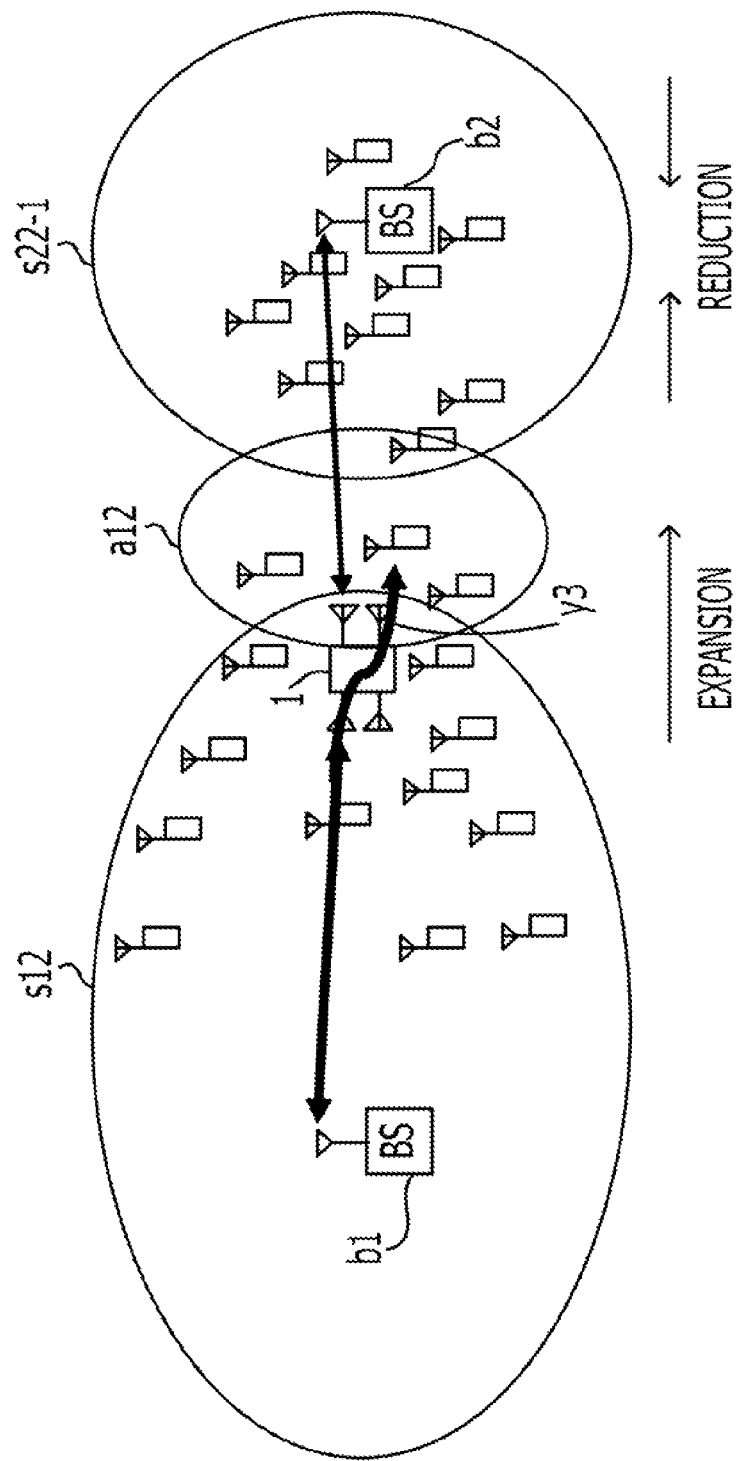
FIG. 11 illustrates the service area after displacement.

FIG. 11 illustrates the service area after displacement. The service area after the displacement of the service area illustrated in FIG. 10 is illustrated. The repeater 1 determines that the base station b1 throughput is "periphery large" and as a result of the determination, the repeater 1 recognizes that many mobile stations are located near the periphery of the cell s12. The repeater 1 also determines that the base station b2 throughput is "center large" and as a result of the determination, the repeater 1 recognizes that many mobile stations are located near the base station b2.

In this case, the repeater 1 determines the path setting related to the relay communication with the base station b1 is a path from the base station b1 to the base station b2 (base station b1 to base station b2). Radio waves emitted by the base station b1 are amplified by the repeater 1 and the amplified radio waves are sent from the periphery of the cell s12 toward the cell s22 according to the path (arrow y3). Therefore, the service area of the repeater 1 for relaying communication with the base station b1 becomes a service area a12 to cover the periphery of cell s12.

Further, the communication power of the repeater 1 for relaying communication with the base station b1 may be maintained at an initial level instead of being changed to a high level since the repeater 1 relays communication to the mobile stations located near the repeater 1.

Moreover, the initial value of the communication power of the base station b1 is maintained since the communication is relayed by the repeater 1. As a result, although the region of the original cell s12 of the base station b1 is not expanded or reduced since the communication power does not change, the cover area is substantially expanded by the service area a12 generated by the repeater 1. In this way, power consumption may be reduced since the cell s12 of the base station b1 is not expanded due to the generation of an appropriate service area by the repeater 1.

On the other hand, the repeater 1 expands the service area of the base station b1 by generating the service area a12 as described above and may reduce the service area of the base station b2 since the service area a12 now covers some of the mobile stations in the cell s22. Therefore, the communication power of the base station b2 may be reduced below the level of the initial value since the mobile stations near the base station b2 may be covered.

Therefore, the communication power of the base station b2 is set to a value with an offset portion subtracted from the communication power initial value. As a result, the cell s22 region of the base station b2 may be reduced by reducing the communication power and thus become a cell s22-1 illustrated in FIG. 11.

When the statistical throughput of the base station b1 is "periphery large" and the statistical throughput of the base station b2 is "center large", the base station b1 communication power $P_{BS1}$, the base station b2 communication power $P_{BS2}$, and the repeater 1 communication power $P_{REP}$ may be described as follows.

$$P_{BS1} = P_{BS1int} \qquad (3a)$$

$$P_{BS2} = P_{BS2int} - P_X \qquad (3b)$$

$$P_{REP} = P_{REPint} \qquad (3c)$$

The path setting in the repeater 1 becomes BS1 to BS2, the base stations b1 and b2 are not connected to each other, and the repeater 1 expands the service area of the base station b1.

(3) The local base stations of the repeater 1 are the base stations b1 and b2. The directivity patterns of the antennas are controlled when the statistical throughput of the base station b1 is "periphery large" and the statistical throughput of the base station b2 is "center large".

Figure 12:
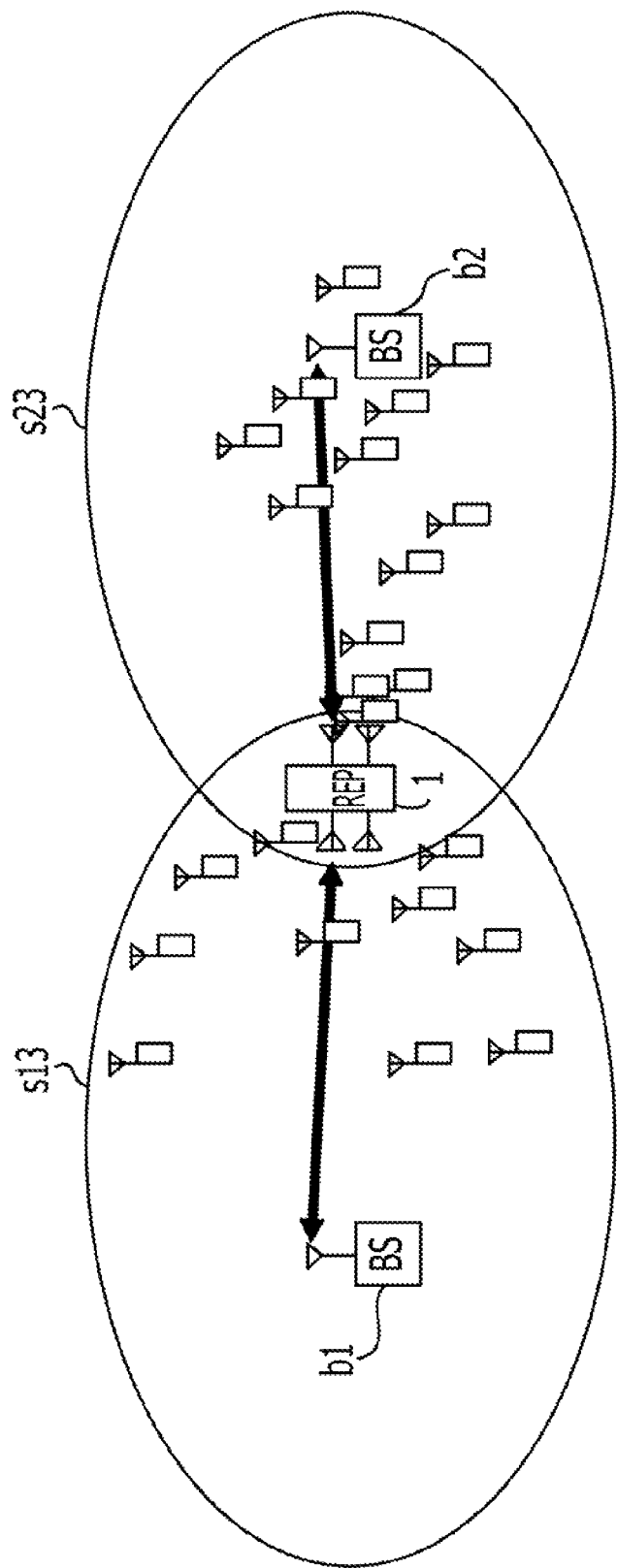
FIG. 12 illustrates a service area before displacement.

FIG. 12 illustrates a service area before displacement. The base station b1 forms a cell s13 and the base station b2 forms a cell s23. The repeater 1 is installed between the base stations b1 and b2 at the peripheries of the cells s13 and s23. The distribution of the mobile stations indicates that many mobile stations are located in the periphery of the cell s13 near the repeater 1 and many mobile stations are located in an area near the base station b2.

Figure 13:
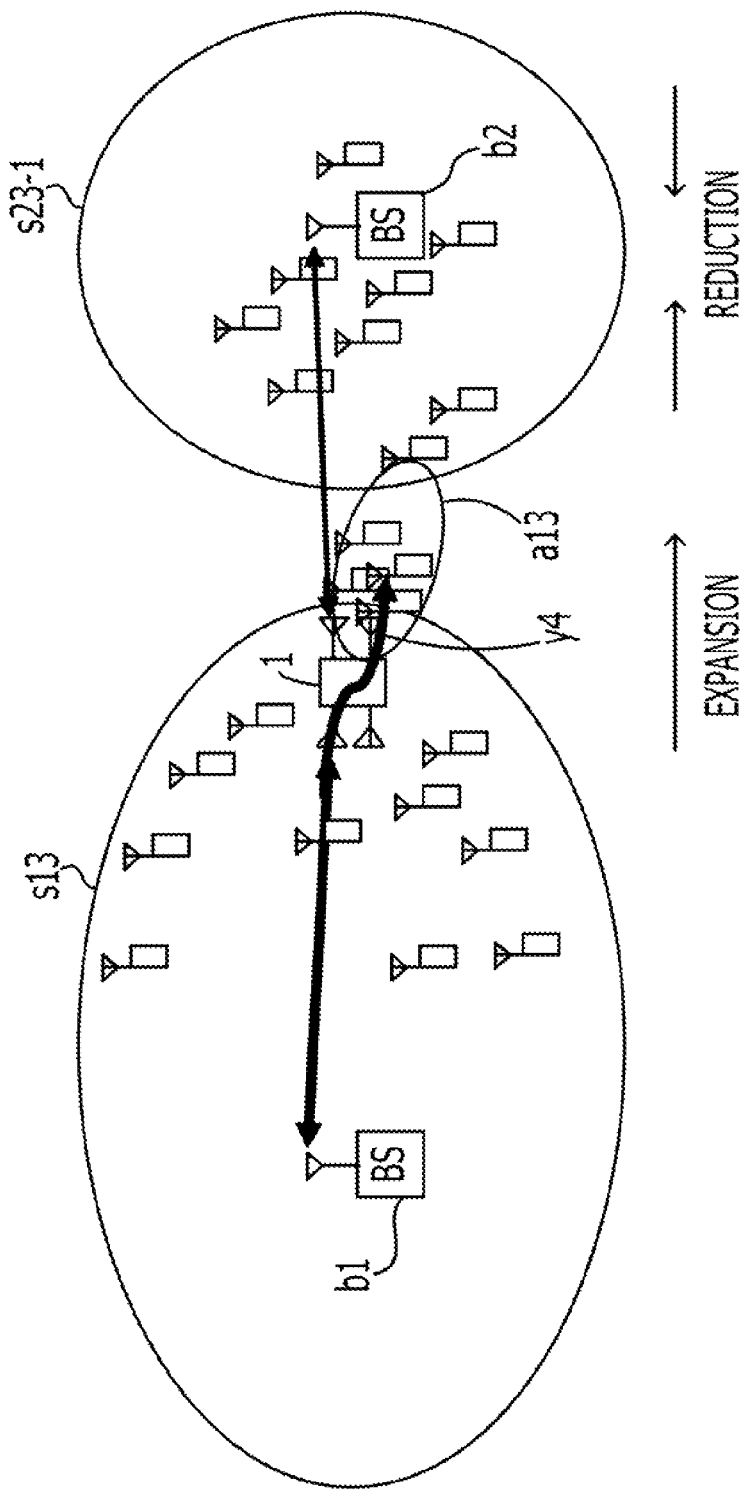
FIG. 13 illustrates the service area after displacement.

FIG. 13 illustrates the service area after displacement. The service area after the displacement of the service area illustrated in FIG. 12 is illustrated. The repeater 1 determines that the base station b1 throughput is "periphery large" and as a result of the determination, the repeater 1 recognizes that many mobile stations are located near the periphery of the cell s13. The repeater 1 also determines that the base station b2 throughput is "center large" and as a result of the determination, the repeater 1 recognizes that many mobile stations are located near the base station b2.

In this case, the repeater 1 determines that the path setting related to the relay communication with the base station b1 is a path from the base station b1 to the base station b2 (base station b1 to base station b2). The repeater 1 points the antenna directivity pattern in a direction to where the mobile stations are concentrated. As a result, radio waves emitted by the base station b1 are amplified by the repeater 1 and the amplified radio waves are transmitted toward the mobile stations located in the cell s23 near the periphery of the call s13 (arrow y4).

Therefore, the service area of the repeater 1 for relaying communication with the base station b1 becomes a service area a13 that includes a portion of the mobile stations in the cell s23 near the periphery of the cell s13.

Further, the communication power for relaying communication with the base station b1 may be maintained at an initial level instead of being changed to a high level since the repeater 1 relays communication to the mobile stations located near the repeater 1.

Moreover, the initial value of the communication power of the base station b1 is maintained since the communication is relayed by the repeater 1. As a result, although the region of the original cell s13 of the base station b1 is not expanded or reduced since the communication power does not change, the cover area is substantially expanded by the service area a13 generated by the repeater 1.

On the other hand, the repeater 1 expands the service area of the base station b1 by generating the service area a13 as described above and may reduce the service area of the base station b2 since the service area a13 now covers a portion of the mobile stations in the cell s23. Therefore, the communication power of the base station b2 may be reduced below the level of the initial value since the mobile stations near the base station b2 may be covered.

Therefore, the communication power of the base station b2 is set to a value with an offset portion subtracted from the communication power initial value. As a result, the cell s23 region of the base station b2 may be reduced by reducing the communication power and thus become a cell s23-1 illustrated in FIG. 13.

When the statistical throughput of the base station b1 is "periphery large", the statistical throughput of the base station b2 is "center large", and the directivity patterns of the antennas are controlled, the base station b1 communication power $P_{BS1}$, the base station b2 communication power $P_{BS2}$, and the repeater 1 communication power $P_{REP}$ may be described by the above equations 3a to 3c.

The path setting in the repeater 1 becomes BS1 to BS2 and the base stations b1 and b2 are not connected to each other. The directivity of the mobile station-oriented antennas of the repeater 1 is operated by the repeater 1 to expand the cell of the base station b1 by pointing the angular direction toward the concentration of mobile stations.

The following is an explanation of the operations of the repeater 1 when searching for an angular direction toward spots where the statistical throughput is largest and mobile stations are concentrated. For example, the repeater 1 searches for a direction from the repeater 1 toward a spot where mobile stations are concentrated using mobile station position information that may be derived from a Global Positioning System (GPS) and the like and from the repeater 1 position information.

Figure 14:
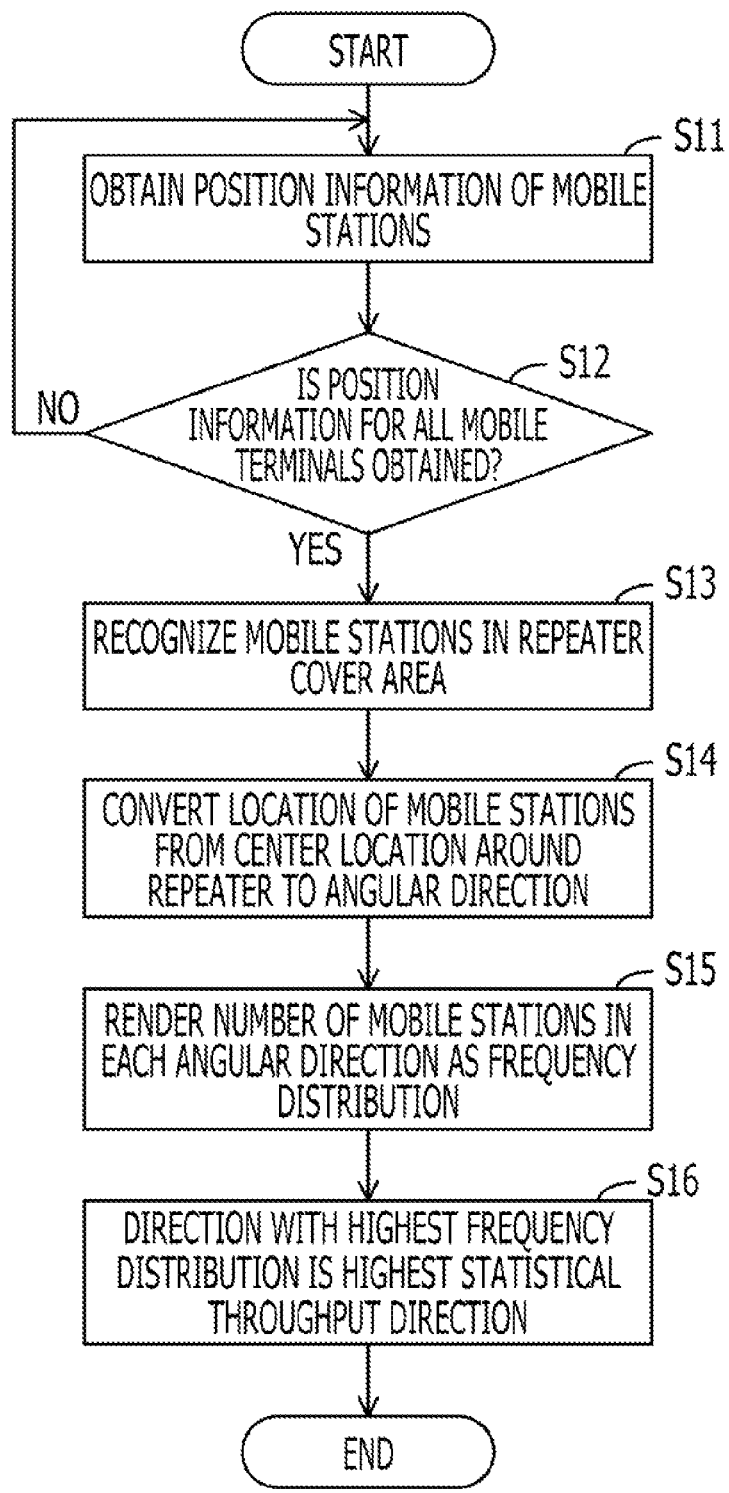
FIG. 14 is an operation flow chart of searching for an angular direction toward a concentration of mobile stations.

FIG. 14 is an operation flow chart of a repeater 1 searching for an angular direction toward a concentration of mobile stations.

(S11) The repeater 1 obtains the position information of the mobile stations.

(S12) When the position information of all the mobile stations is obtained, the process advances to operation S13 or returns to operation S11 if not obtained.

(S13) The repeater 1 recognizes mobile stations in the cover area of the host repeater 1.

(S14) The repeater 1 converts the location of the mobile stations from the center location surrounding the repeater 1 to an angular direction.

(S15) The number of mobile stations for each angular direction is rendered as the frequency distribution.

(S16) The angular direction with the highest frequency distribution is chosen as the angular direction toward the highest concentration of mobile stations.

Figure 15:
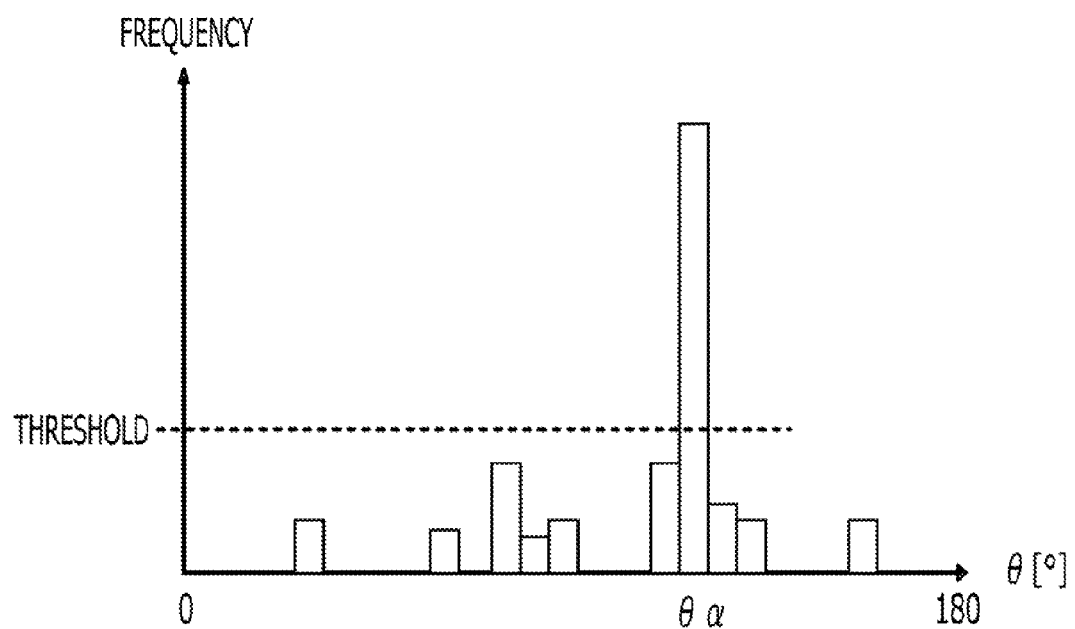
FIG. 15 illustrates a frequency distribution.

FIG. 15 illustrates a frequency distribution. The vertical axis represents the frequency and the horizontal axis represents the angular direction θ [deg]. The number of mobile stations at each angular direction is indicated by the frequency distribution. In FIG. 15, the angular direction with the highest concentration of mobile stations is θα.

(4) The local base station of the repeater 1 is the base station b1. The statistical throughput of the base station b1 is "periphery large".

Figure 16:
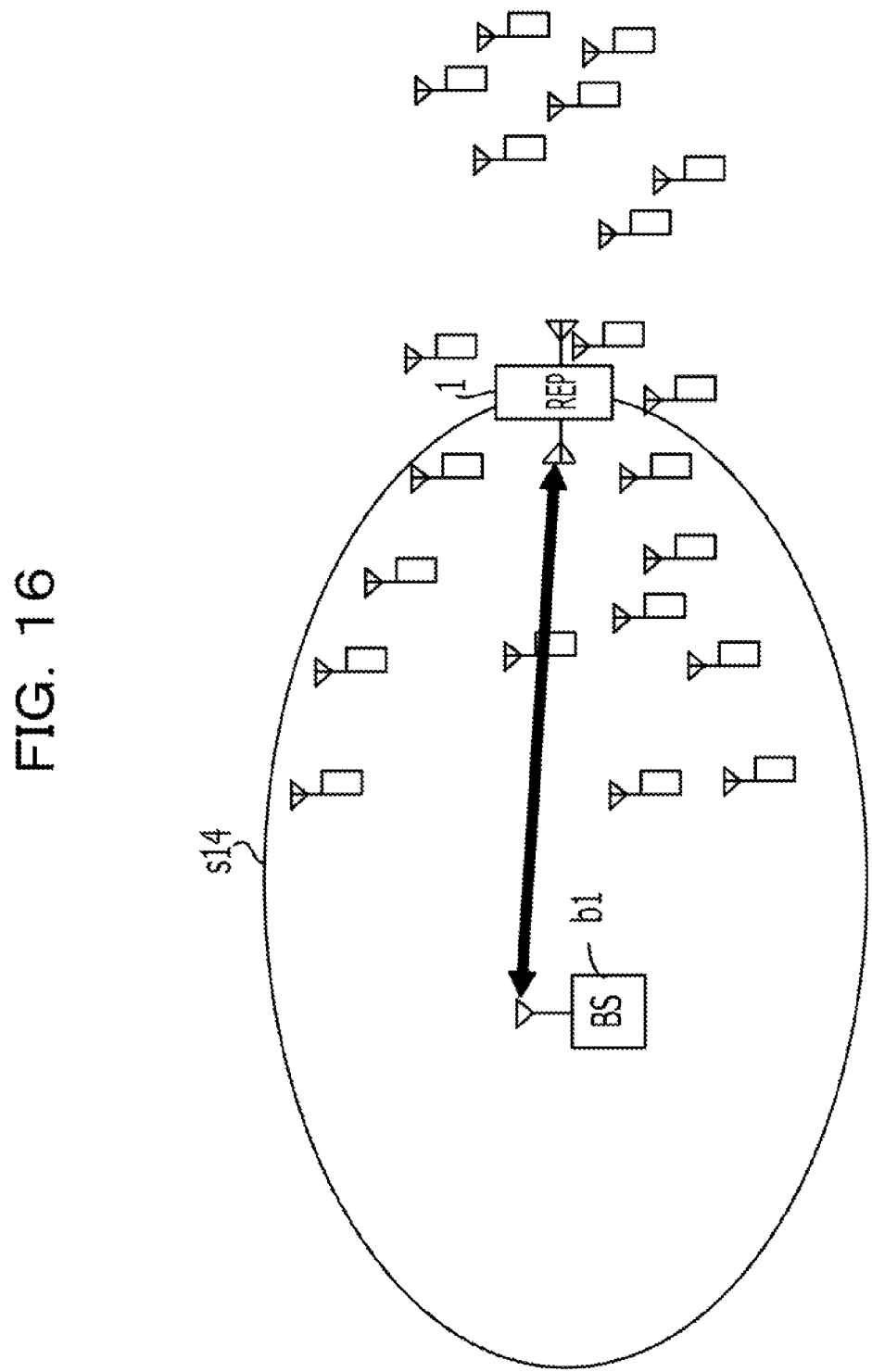
FIG. 16 illustrates a service area before displacement.

FIG. 16 illustrates a service area before displacement. The base station b1 configures a cell s14. The repeater 1 is placed in the periphery of the cell s14. The distribution of the mobile stations indicates that many mobile stations are located in a region near the repeater 1 not covered by the cell s14 as well as in the periphery of the cell s14 near the repeater 1.

Figure 17:
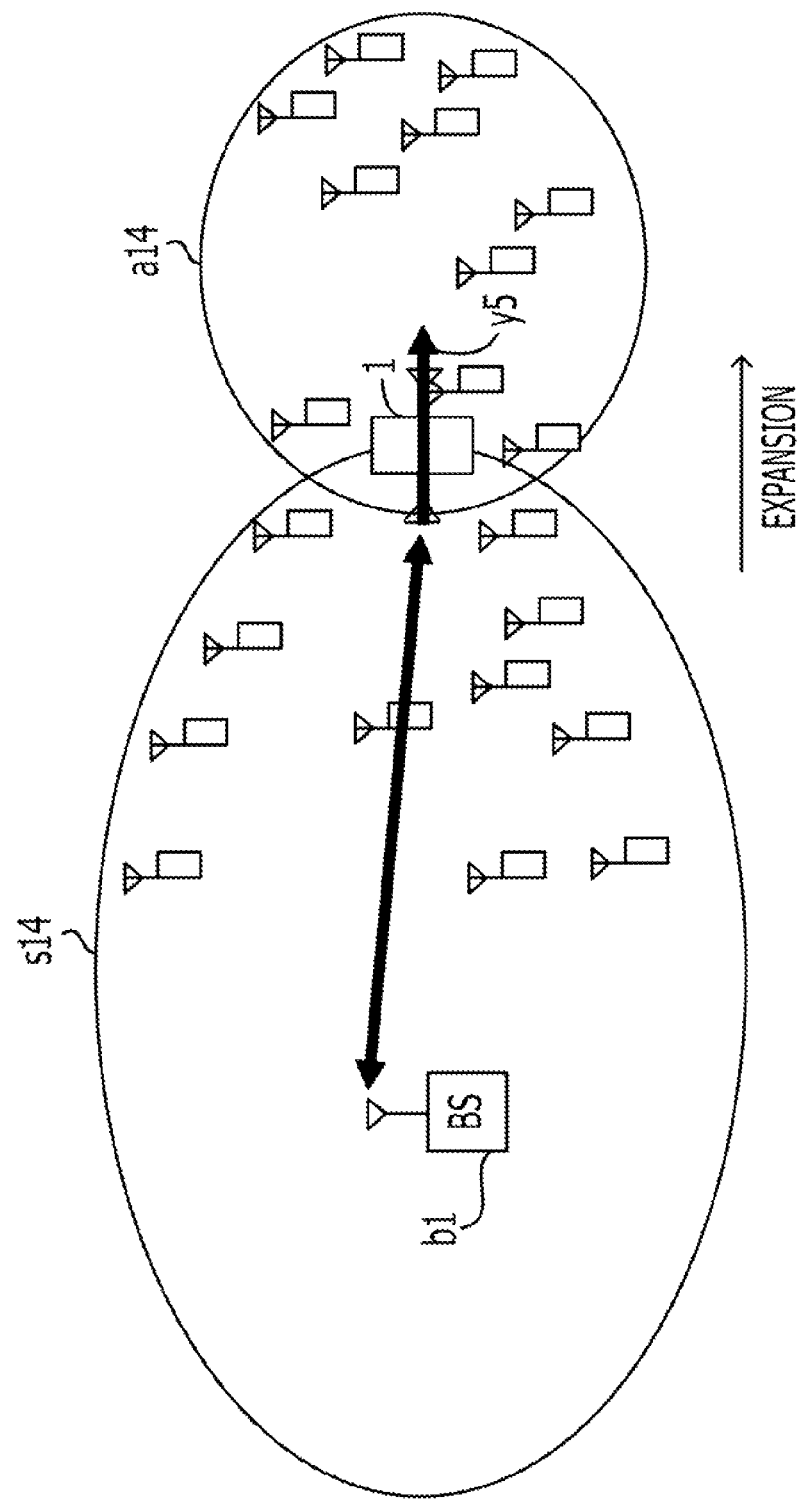
FIG. 17 illustrates the service area after displacement.

FIG. 17 illustrates the service area after displacement. The service area after the displacement of the service area illustrated in FIG. 16 is illustrated. The repeater 1 determines that the base station b1 statistical throughput is "periphery large" and as a result of the determination, the repeater 1 recognizes that many mobile stations are located near the periphery of the cell s14.

In this case, the repeater 1 changes the antenna direction of the mobile station-oriented antennas toward a cell s14 expansion direction (arrow y5). Therefore, the service area of the repeater 1 for relaying communication with the base station b1 becomes a service area a14 in the expansion direction of the cell s14. Further, the communication power for relaying communication with the base station b1 may be maintained at an initial level instead of being changed to a high level since the repeater 1 relays communication to the mobile stations located near the repeater 1.

Moreover, the initial value of the communication power of the base station b1 is maintained since the communication is relayed by the repeater 1. As a result, although the region of the original cell s14 of the base station b1 is not expanded or reduced since the communication power does not change, the cover area is substantially expanded by the service area a14 generated by the repeater 1.

When the statistical throughput of the base station b1 is "periphery large", the base station b1 communication power $P_{BS1}$ and the repeater 1 communication power $P_{REP}$ may be described as follows.

$$P_{BS1}=P_{BS1int} \tag{4a}$$

$$P_{REP}=P_{REPint} \tag{4b}$$

(5) The local base station near the repeater 1 is the base stations b1. The directivity patterns of the antennas are controlled when the statistical throughput of the base station b1 is "periphery large".

Figure 18:
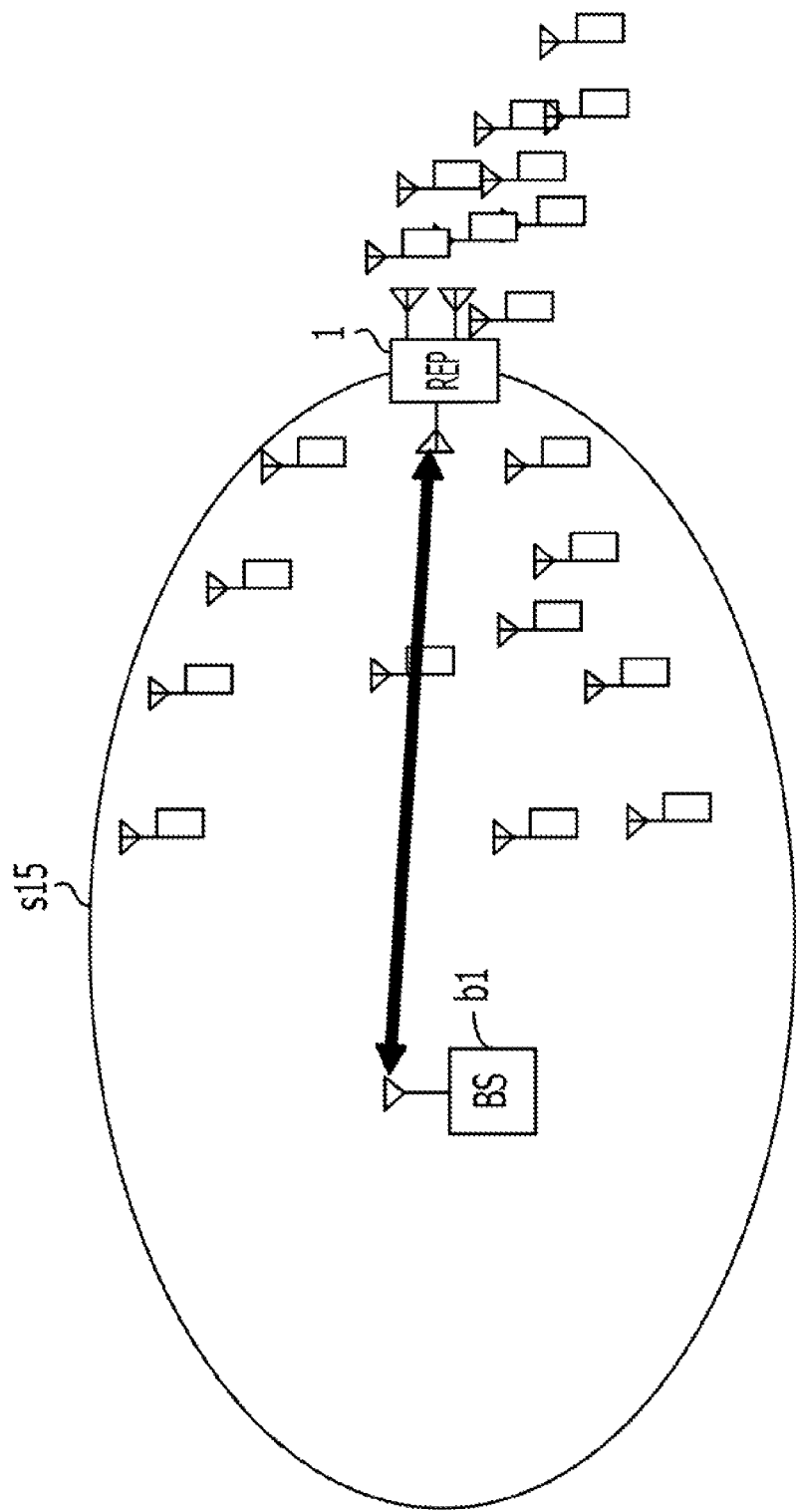
FIG. 18 illustrates a service area before displacement.

FIG. 18 illustrates a service area before displacement. The base station b1 configures a cell s15. The repeater 1 is placed in the periphery of the cell s15. The distribution of the mobile stations indicates that many mobile stations are located in a region near the repeater 1 not covered by the cell s15 as well as in the periphery of the cell s15 near the repeater 1.

Figure 19:
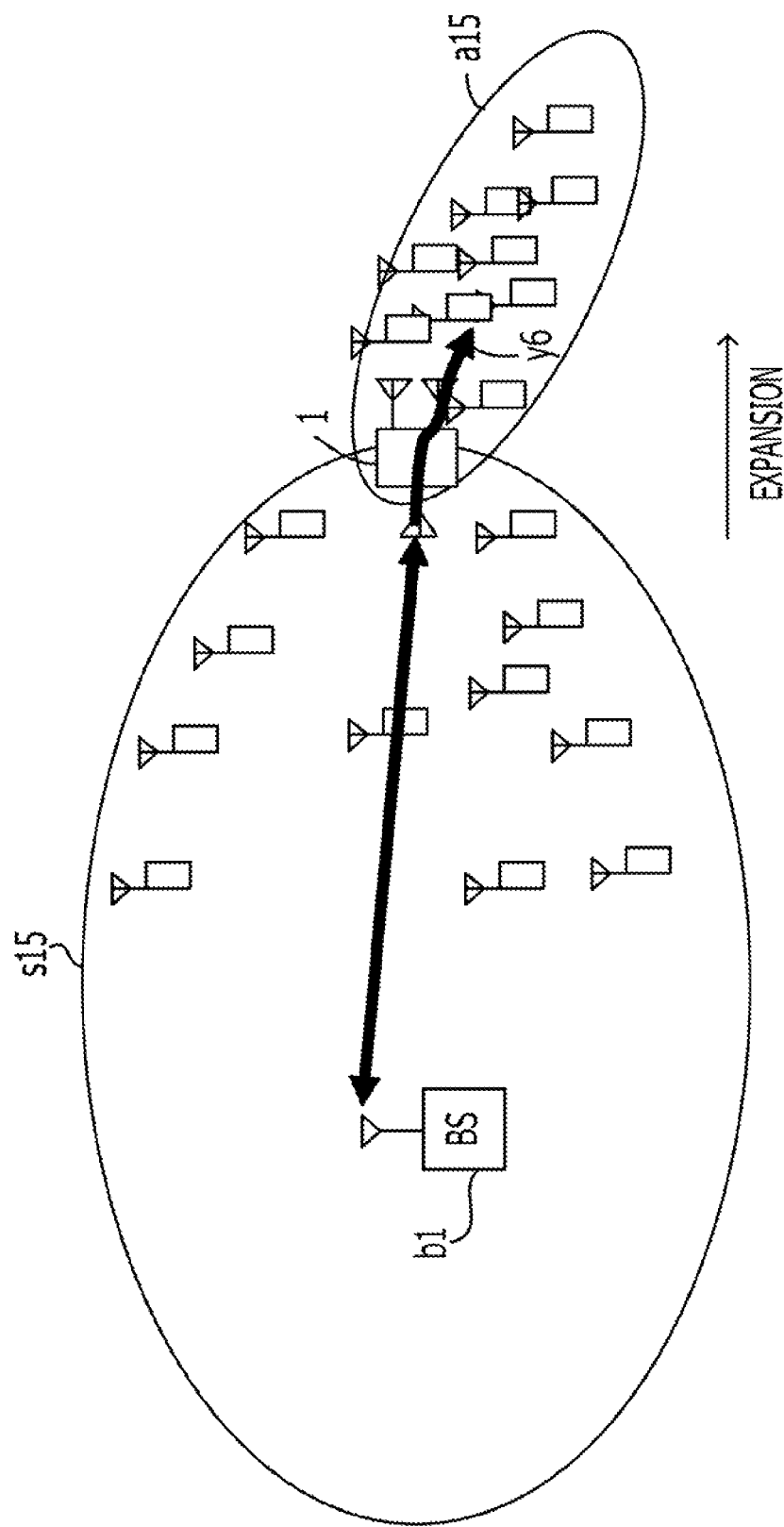
FIG. 19 illustrates the service area after displacement.

FIG. 19 illustrates the service area after displacement. The service area after the displacement of the service area illustrated in FIG. 18 is illustrated. The repeater 1 determines that the base station b1 throughput is "periphery large" and as a result of the determination, the repeater 1 recognizes that many mobile stations are located near the periphery of the cell s15.

The repeater 1 points the antenna directions of the mobile station-oriented antennas in the expansion direction of the cell s15 and points the antenna directivity pattern toward the angular direction of the concentrated mobile stations (arrow y6). Therefore, the service area for relaying communication between the repeater 1 and the base station b1 becomes a service area a15 that includes the mobile stations located in the periphery of the cell s15.

Further, the communication power of the repeater 1 for relaying communication with the base station b1 may be maintained at an initial level instead of being changed to a high level since the repeater 1 relays communication to the mobile stations located near the repeater 1.

Moreover, the initial value of the communication power of the base station b1 is maintained since the communication is relayed by the repeater 1. As a result, although the region of the original cell s15 of the base station b1 is not expanded or reduced since the communication power does not change, the cover area is substantially expanded by the service area a15 generated by the repeater 1.

Communication power $P_{BS1}$ of the base station b1 and communication power $P_{REP}$ of the repeater 1 may be derived from the above equations 4a and 4b if the antenna directivity pattern is controlled when the statistical throughput of the base station b1 is "periphery large". The directivity of the mobile station-oriented antennas of the repeater 1 is also operated by the repeater 1 to expand the cell of the base station b1 by pointing the angular direction toward the concentration of mobile stations.

(6) The local base stations of the repeater 1 are the base stations b1 and b2. The statistical throughput of the base station b1 is "center large" and the statistical throughput of the base station b2 is "periphery large".

Figure 20:
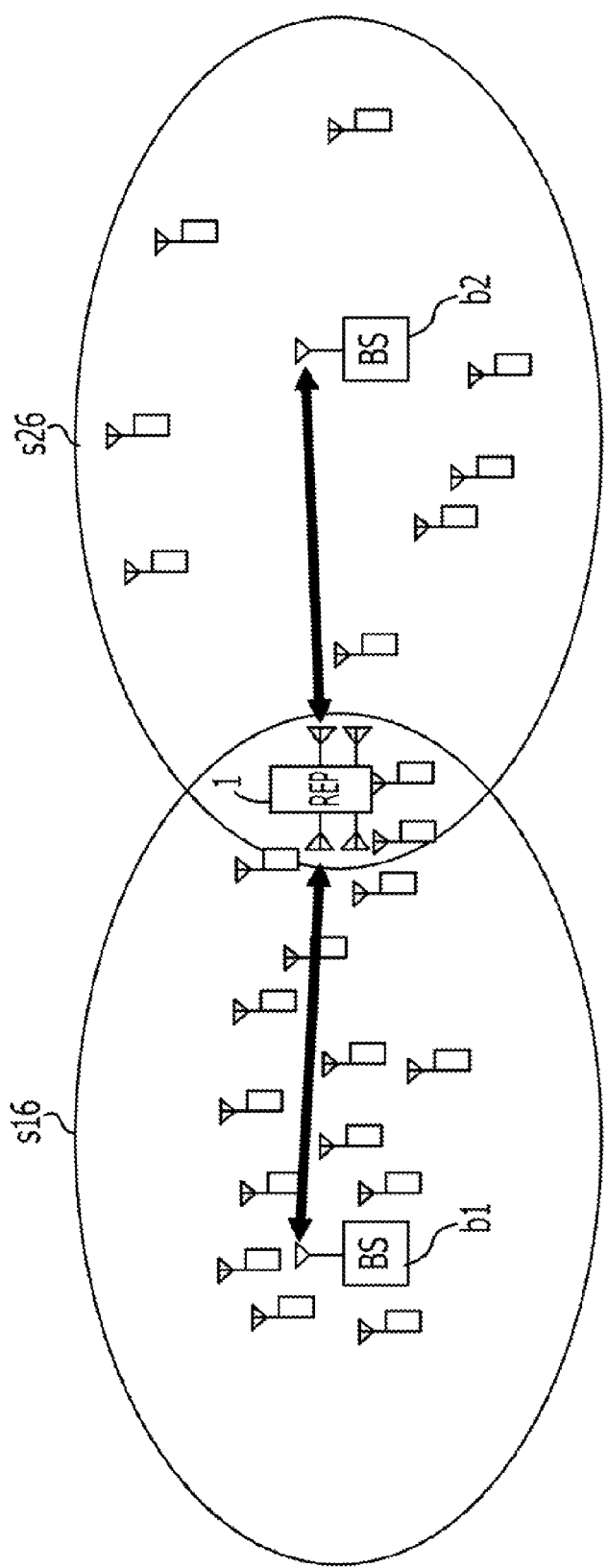
FIG. 20 illustrates a service area before displacement.

FIG. 20 illustrates a service area before displacement. The base station b1 forms a cell s16 and the base station b2 forms a cell s26. The repeater 1 is installed between the base stations b1 and b2 at the peripheries of the cells s16 and s26. The distribution of the mobile stations indicates that many mobile stations are located near the base station b1 and many mobile stations are located in the periphery of cell s26.

Figure 21:
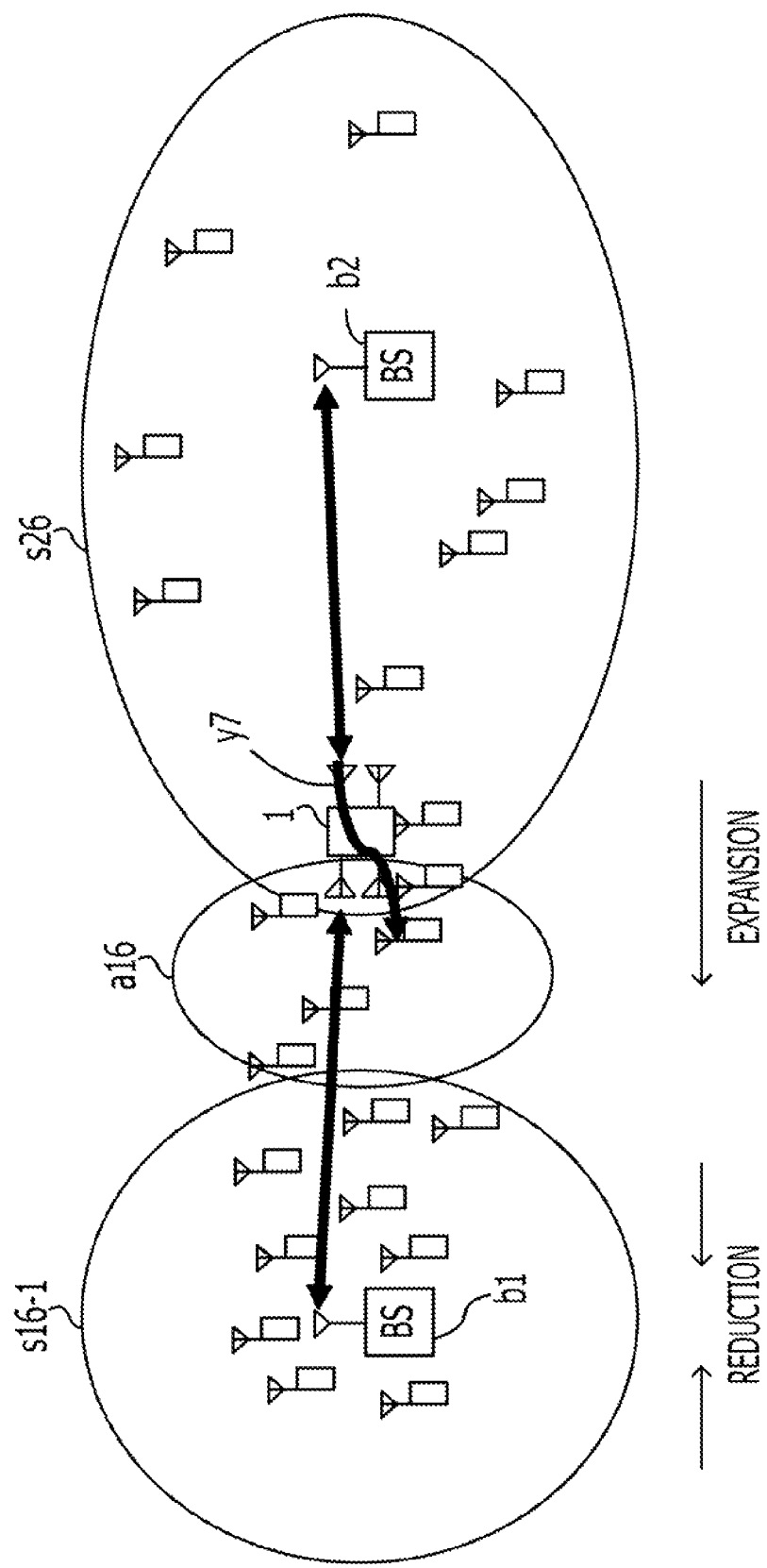
FIG. 21 illustrates the service area after displacement.

FIG. 21 illustrates the service area after displacement. The service area after the displacement of the service area illustrated in FIG. 20 is illustrated. The repeater 1 determines that the base station b1 statistical throughput is "center large" and as a result of the determination, the repeater 1 recognizes that many mobile stations are located near the base station b1. The repeater 1 determines that the base station b2 statistical throughput is "periphery large" and as a result of the determination, the repeater 1 recognizes that many mobile stations are located near the periphery of the cell s26.

In this case, the repeater 1 determines that the path setting related to the relay communication with the base station b2 shall be a path from the base station b2 toward the base station b1 (base station b2 to base station b1). Radio waves emitted by the base station b2 are amplified by the repeater 1 and the amplified radio waves are transmitted from the periphery of the cell s26 toward the cell s16 according to the path (arrow y7).

Therefore, the service area of the repeater 1 for relaying communication with the base station b2 becomes a service area a16 to cover the periphery of cell s26. Further, the communication power of the repeater 1 for relaying communication with the base station b1 may be maintained at an initial level instead of being changed to a high level since the repeater 1 relays communication to the mobile stations located near the repeater 1.

Moreover, the initial value of the communication power of the base station b2 is maintained since the communication is relayed by the repeater 1. As a result, although the region of the original cell s26 of the base station b2 is not expanded or reduced since the communication power does not change, the cover area is substantially expanded by the service area a16 generated by the repeater 1.

On the other hand, the repeater 1 expands the service area of the base station b2 by forming the service area a16 as described above and may reduce the service area of the base station b1 since the service area a16 now covers a portion of the mobile stations in the cell s16. As a result, the communication power of the base station b1 may be reduced below the level of the initial value to cover the mobile stations near the base station b1.

Therefore, the communication power of the base station b1 is set to a value with an offset portion subtracted from the communication power initial value. As a result, the cell s16 region of the base station b1 may be reduced by reducing the communication power and thus become a cell s16-1 illustrated in FIG. 21.

When the statistical throughput of the base stations b1 is "center large" and the statistical throughput of the base stations b2 is "periphery large", the base station b1 communication power $P_{BS1}$, the base station b2 communication power $P_{BS2}$, and the repeater 1 communication power $P_{REP}$ may be described as follows.

$$P_{BS1} = P_{BS1int} - P_X \quad (5a)$$

$$P_{BS2} = P_{BS2int} \quad (5b)$$

$$P_{REP} = P_{REPint} \quad (5c)$$

The path setting in the repeater 1 becomes BS2 to BS1, the base stations b1 and b2 are not connected to each other, and the repeater 1 expands the service area of the base station b2.

(7) The local base stations of the repeater 1 are the base stations b1 and b2. The statistical throughput of the base station b1 is "periphery large" and the statistical throughput of the base station b2 is "periphery large".

Figure 22:
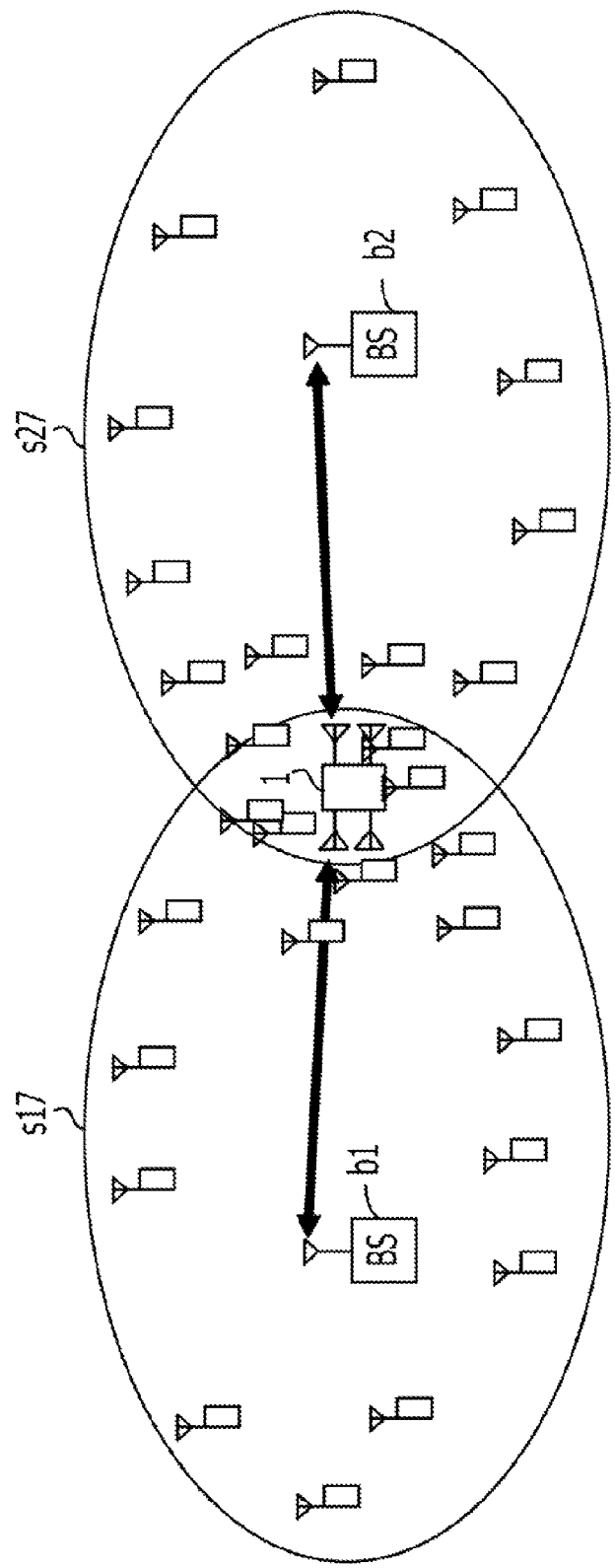
FIG. 22 illustrates a service area before displacement.

FIG. 22 illustrates a service area before displacement. The base station b1 forms a cell s17 and the base station b2 forms a cell s27. The repeater 1 is installed between the base stations b1 and b2 at the peripheries of the cells s17 and s27. The distribution of the mobile stations indicates that many mobile stations are located at the peripheries of the cell s17 and the cell s27.

Figure 23:
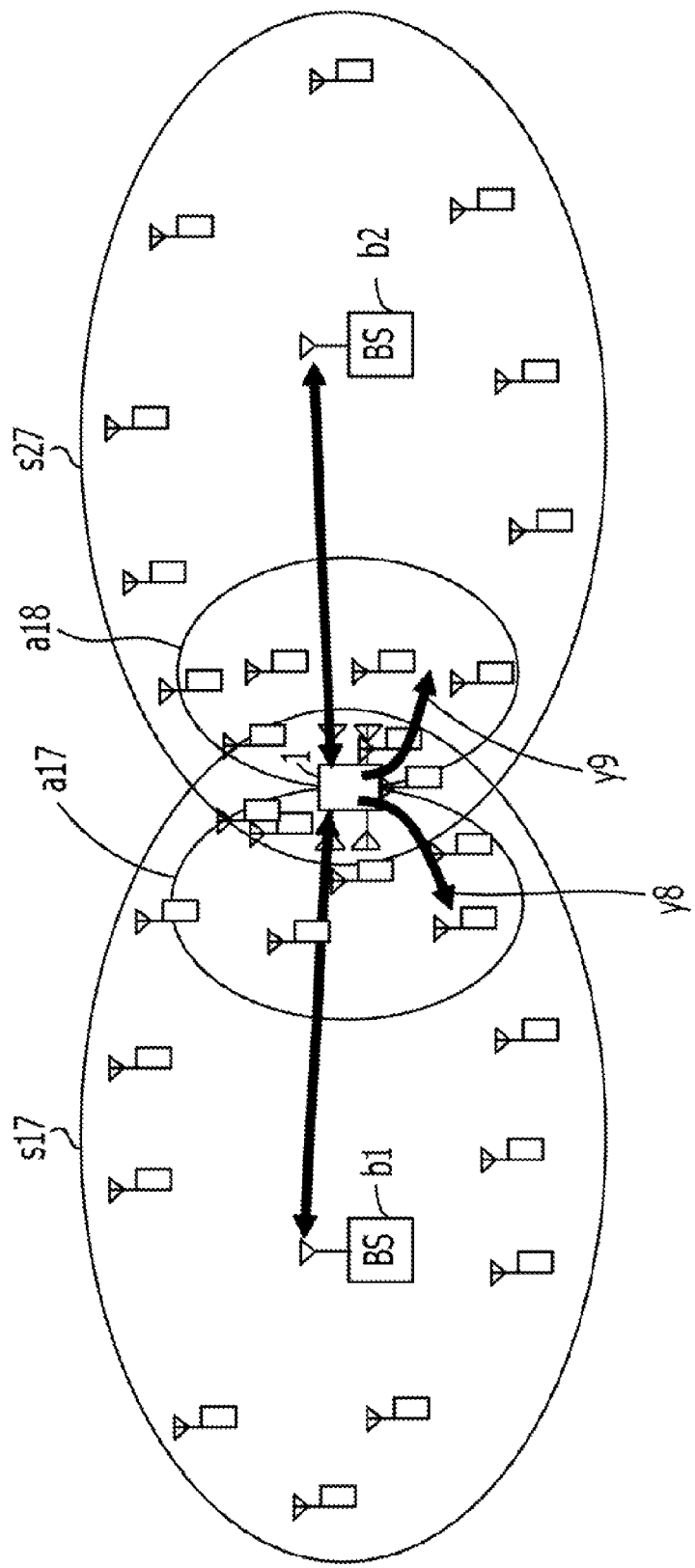
FIG. 23 illustrates the service area after displacement.

FIG. 23 illustrates the service area after displacement. The service area after the displacement of the service area illustrated in FIG. 22 is illustrated. The repeater 1 determines that the base station b1 statistical throughput is "periphery large" and as a result of the determination, the repeater 1 recognizes that many mobile stations are located near the periphery of the cell s17. The repeater 1 determines that the base station b2 statistical throughput is "periphery large" and as a result of the determination, the repeater 1 recognizes that many mobile stations are located near the periphery of the cell s27.

In this case, the repeater 1 determines the path setting related to the relay communication with the base station b1 as a return path from the base station b1 and back toward the base station b1 (base station b1 to base station b1). Based on this path, the radio waves emitted by the base station b1 are amplified by the repeater 1 and the amplified radio waves are sent back toward the mobile stations located near the base station b1 (arrow y8). Therefore, the service area of the repeater 1 for relaying communication with the base station b1 becomes a service area a17 that includes a region between the base station b1 and the repeater 1.

Further, the communication power of the repeater 1 for relaying communication with the base station b1 may be maintained at an initial level instead of being changed to a high level since the repeater 1 relays communication to the mobile stations located near the repeater 1.

Moreover, the initial value of the communication power of the base station b1 is maintained since the communication is relayed by the repeater 1. As a result, the region of the cell s17 of the base station b1 is maintained in the current state without expanding or reducing since the communication power does not change.

Similarly, the repeater 1 determines the path setting related to the relay communication with the base station b2 is a return path from the base station b2 and back to the base station b2 (base station b2 to base station b2). Based on this path, the radio waves emitted by the base station b2 are amplified by the repeater 1 and the amplified radio waves are sent back toward the mobile stations located near the base station b2 (arrow y9). Therefore, the service area of the repeater 1 for relaying communication with the base station b2 becomes a service area a18 that includes a region between the base station b1 and the repeater 1.

Further, the communication power of the repeater 1 for relaying communication with the base station b2 may be maintained at an initial level instead of being changed to a high level since the repeater 1 relays communication to the mobile stations located near the repeater 1.

Moreover, the initial value of the communication power of the base station b2 is maintained since the communication is relayed by the repeater 1. As a result, the region of the cell s27 of the base station b2 is maintained in the current state without expanding or reducing since the communication power does not change.

When the statistical throughput of the base station b1 is "periphery large" and the statistical throughput of the base station b2 is "periphery large", the base station b1 communication power $P_{BS1}$, the base station b2 communication power $P_{BS2}$, and the repeater 1 communication power $P_{REP}$ may be described as follows.

$$P_{BS1}=P_{BS1int} \quad (6a)$$

$$P_{BS2}=P_{BS2int} \quad (6b)$$

$$P_{REP}=P_{REPint} \quad (6c)$$

Figure 24:
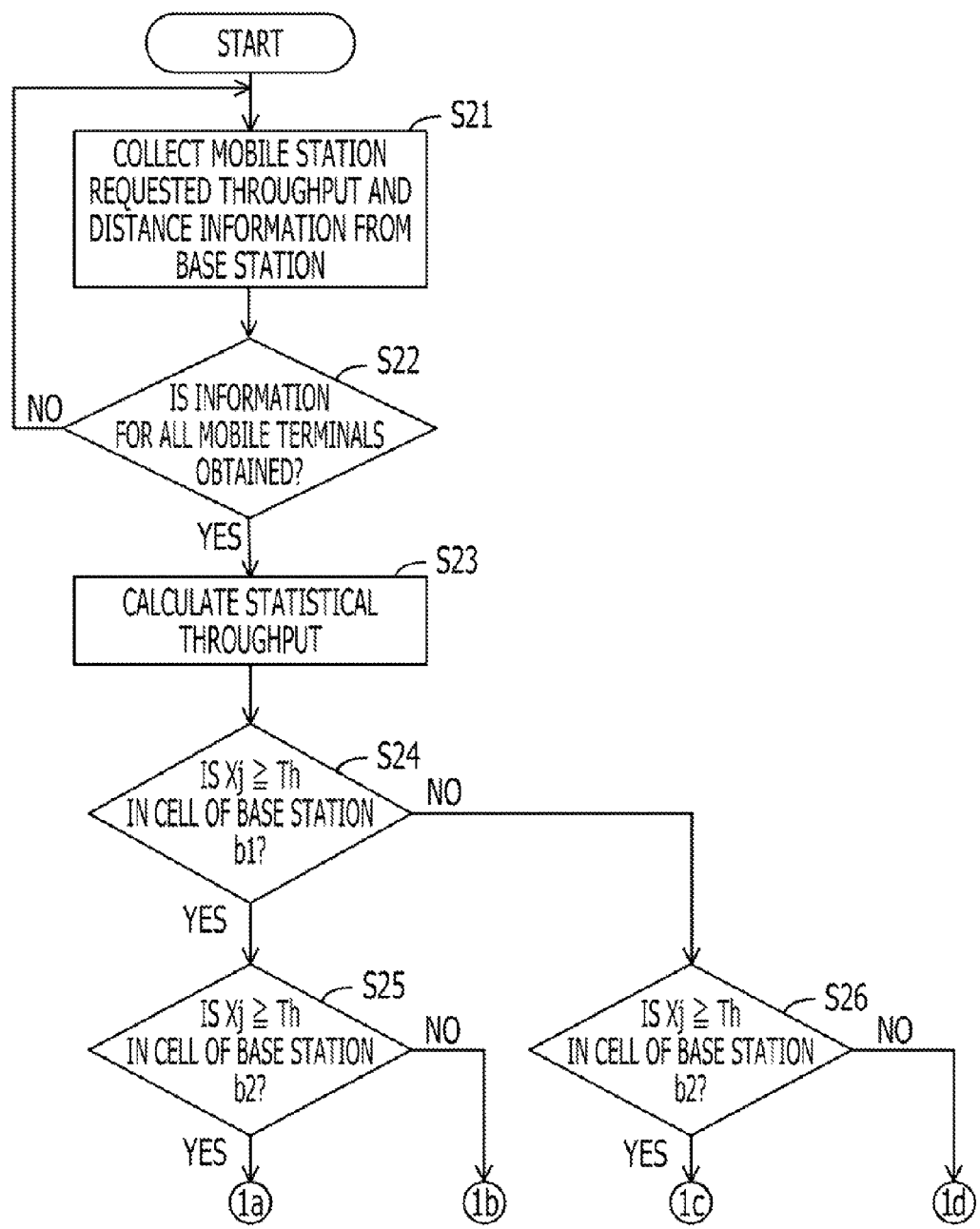
FIG. 24 is a flowchart illustrating communication control unit operations.
Figure 25:
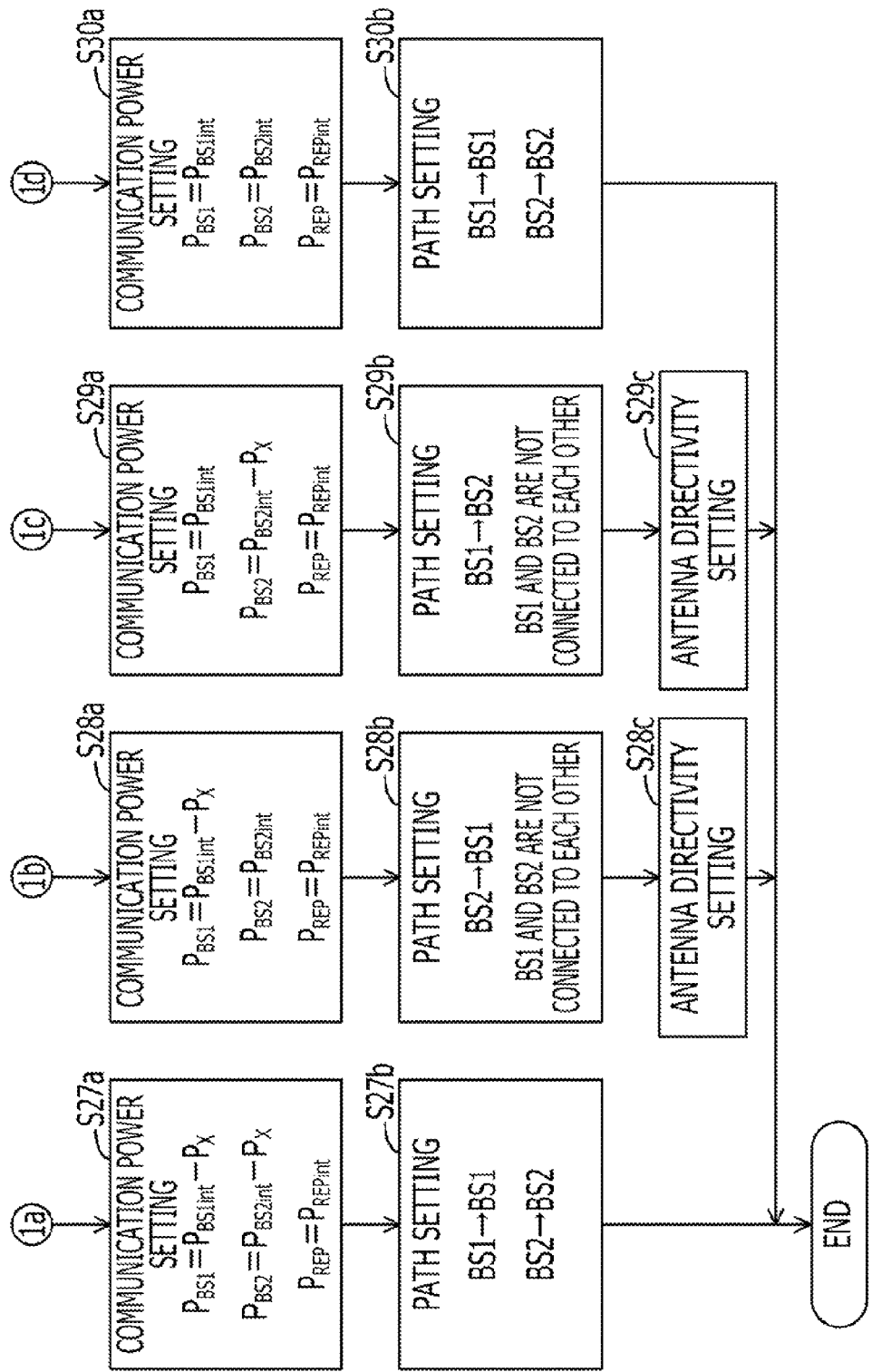
FIG. 25 is a flowchart illustrating communication control unit operations.

The following is an explanation of the operations of the communication control unit 10 in the repeater 1 in the form of a flow chart. FIGS. 24 and 25 represent a flowchart illustrating communication control unit operations. The base stations near the repeater 1 are the base stations b1 and b2.

(S21) The communication control unit 10 obtains the mobile station requested throughput and distance information from the base stations.

(S22) When the mobile station requested throughput and distance information for all the mobile stations is obtained, the process advances to operation S23, or returns to operation S21 if not all of the information is obtained.

(S23) The communication control unit 10 derives the total sum of the ratios between the mobile station requested throughput and the distance information and calculates the statistical throughput $X_j$.

(S24) The communication control unit 10 determines that $X_j$ is greater than or equal to Th for the base station b1 cell. If $X_j$ is greater than or equal to Th, the process advances to operation S25. If $X_j$ is less than Th the process advances to operation S26.

(S25) The communication control unit 10 determines that $X_j$ is greater than or equal to Th for the cell of the base station b2. If $X_j$ is greater than or equal to Th, the process advances to operation S27a. If $X_j$ is less than Th the process advances to operation S28a.

(S26) The communication control unit 10 determines that $X_j$ is greater than or equal to Th for the cell of the base station b2. If $X_j$ is greater than or equal to Th, the process advances to operation S29a. If $X_j$ is less than Th the process advances to operation S30a.

(S27a) The communication control unit 10 sets the communication power of the base stations and the host repeater 1. The equations for setting the communication power may be the above-mentioned equations 2a to 2c.

(S27b) The communication control unit 10 sets the paths. The communication control unit 10 sets one path from base station b1 to base station b1 and the other path from base station b2 to base station b2.

(S28a) The communication control unit 10 sets the communication power of the base stations and the host repeater 1. The equations for setting the communication power may be the above-mentioned equations 5a to 5c.

(S28b) The communication control unit 10 sets the paths. The communication control unit 10 sets a path from base station b2 to base station b1, where the base station b1 and the base station b2 have not been connected.

(S28c) The communication control unit 10 sets the directivity patterns of the array antennas to the angular direction toward the highest concentration of mobile stations.

(S29a) The communication control unit 10 sets the communication power of the base stations and the repeater 1. The equations for setting the communication power may be the above-mentioned equations 3a to 3c.

(S29b) The communication control unit 10 sets the paths. The communication control unit 10 sets a path from base station b1 to base station b2, where the base station b1 and the base station b2 have not been connected.

(S29c) The communication control unit 10 sets the directivity patterns of the array antennas to the angular direction toward the highest concentration of mobile stations.

(S30a) The communication control unit 10 sets the communication power of the base stations and the host repeater 1. The equations for setting the communication power may be the above-mentioned equations 6a to 6c.

(S30b) The communication control unit 10 sets the paths. The communication control unit 10 sets one path from base station b1 to base station b1 and the other path from base station b2 to base station b2.

As described above, the repeater 1 has a signaling function to conduct signaling with the base stations. The repeater 1 autonomously and adaptively controls the expansion and reduction of the service areas of the surrounding base stations and the repeater's own service area in response to the location of the mobile stations recognized by conducting signaling with the base stations. As a result, the service areas may be optimized and communication quality may be improved.

The embodiment described above is an example embodiment and the configurations of the components illustrated in the embodiment may be replaced by other items including similar functions. Other arbitrary constituent elements and operations may also be added.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A wireless communication device comprising:
a set of antennas that transmit and receive wireless signals,
one or more processors configured to conduct communication with a base station and control displacement of a service area of the base station and a service area of the wireless communication device in response to throughput characteristics of a cell formed by the base station, wherein
the one or more processors point a radio wave path of the wireless communication device toward an expansion direction of the service area of the base station or toward a location direction of mobile stations to form the service area of the wireless communication device when the one or more processors determine that the mobile stations are located in the periphery of the service area of the base station.

2. The wireless communication device according to claim 1, wherein:
the one or more processors
collect information on distances between the base station and the mobile stations and mobile station requested throughputs requested by the mobile stations,
calculate a statistical throughput that is a sum of the ratios of the mobile station requested throughputs and the distances, and recognize the throughput characteristics of the cell based on the statistical throughput.

3. The wireless communication device according to claim 2 wherein:
the one or more processors
compare the statistical throughput with a threshold,
determine that the mobile stations are located near the base station when the statistical throughput is larger than the threshold, and
determine that the mobile stations are located near the periphery of the service area of the base station when the statistical throughput is less than the threshold.

4. The wireless communication device according to claim 1, wherein the one or more processors transmit an instruction to reduce the communication power of the base station to reduce the service area of the base station when the one or more processors determine that the mobile stations are located near the base station.

5. The wireless communication device according to claim 1 wherein:
the set of antennas has an array antenna configuration, and
the one or more processors search for an angular direction toward a concentration of the mobile stations and points a directivity pattern of the array antenna in the angular direction.

6. A wireless communication method conducted by a wireless communication device, the method comprising:
transmitting and receiving wireless signals through a set of antennas, and
conducting communication with a base station and controlling displacement of a service area of the base station and a service area of the wireless communication device in response to throughput characteristics of a cell formed by the base station; and
pointing a radio wave path of the wireless communication device toward an expansion direction of the service area of the base station or toward a location direction of mobile stations to form the service area of the wireless communication device when the communication control unit determines that the mobile stations are located in the periphery of the service area of the base station.

7. The wireless communication method according to claim 6, further comprising:
collecting information on distances between the base station and the mobile stations and mobile station requested throughputs requested by the mobile stations,
calculating a statistical throughput that is a sum of the ratios of the mobile station requested throughputs and the distances, and
recognizing the throughput characteristics of the cell based on the statistical throughput.

8. The wireless communication method according to claim 7, further comprising:
comparing the statistical throughput with a threshold,
determining that the mobile stations are located near the base station when the statistical throughput is larger than the threshold, and
determining that the mobile stations are located near the periphery of the service area of the base station when the statistical throughput is less than the threshold.

9. The wireless communication method according to claim 6, further comprising:
transmitting an instruction to reduce the communication power of the base station to reduce the service area of the base station when the communication control unit determines that the mobile stations are located near the base station.

10. The wireless communication method according to claim 6, wherein the set of antennas has an array antenna configuration, and further comprising:
searching for an angular direction toward a concentration of the mobile stations and
pointing a directivity pattern of the array antenna in the angular direction.

\* \* \* \* \*